United States Patent
Zhang

(10) Patent No.: US 11,051,335 B2
(45) Date of Patent: Jun. 29, 2021

(54) METHOD AND DEVICE FOR WIRELESS COMMUNICATION IN A FIRST NODE AND BASE STATION

(71) Applicant: SHANGHAI LANGBO COMMUNICATION TECHNOLOGY COMPANY LIMITED, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/373,639

(22) Filed: Apr. 3, 2019

(65) Prior Publication Data

US 2019/0313452 A1 Oct. 10, 2019

(30) Foreign Application Priority Data

Apr. 6, 2018 (CN) .......................... 201810302835.0

(51) Int. Cl.
*H04W 74/08* (2009.01)
(52) U.S. Cl.
CPC .............................. *H04W 74/0808* (2013.01)
(58) Field of Classification Search
CPC ................................................ H04W 74/0808
See application file for complete search history.

(56) References Cited

U.S. PATENT DOCUMENTS

| 2016/0037560 | A1* | 2/2016 | Liu .......................... H04L 51/28 370/329 |
| 2017/0118774 | A1* | 4/2017 | Cariou .............. H04W 74/0816 |
| 2017/0238334 | A1* | 8/2017 | Yang ................. H04W 74/0808 370/336 |
| 2017/0290059 | A1 | 10/2017 | Karaki et al. |
| 2017/0339721 | A1 | 11/2017 | Mukherjee et al. |
| 2017/0366244 | A1* | 12/2017 | Lee ....................... H04B 7/0619 |

OTHER PUBLICATIONS

«3GPP TSG RAN WG1 Meeting #79 RI-144778» Ericsson Details of Listen-Before-Talk for Nov. 21, 2014 Part 2-3.

(Continued)

*Primary Examiner* — Chi H Pham
*Assistant Examiner* — Ji-Hae Yea
(74) *Attorney, Agent, or Firm* — Maschoff Brennan

(57) ABSTRACT

The disclosure provides a method and a device in a User Equipment (UE) and base station for wireless communication. In one embodiment, the user equipment performs a first listening in a first time domain resource of a first frequency domain resource, transmits a second wireless signal in a second time domain resource of the first frequency domain resource, performs a first supplementary listening in a third time domain resource of the first frequency domain resource, and transmits a first wireless signal in a fourth time domain resource of the first frequency domain resource; wherein the first supplementary listening includes decrementing a first counter based on the first listening. This disclosure can increase the transmission opportunity, thereby improving transmission efficiency and spectrum utilization.

20 Claims, 14 Drawing Sheets

(56) References Cited

OTHER PUBLICATIONS

« 3GPP TSG-RAN WG2 Meeting #90» Huawei, HiSilicon LBT Operation for LAA Uplink Apr. 24, 2015.
«3GPP TSG-RAN WG1 Meeting #84 RI-160817» Broadcom Limited Discussion on LAA UL LBT Design.
CN Search Report in application No. 201810302835.0 dated Jun. 3, 2020.
CN First Office Action in Application No. 201810302835.0 dated Jun. 11, 2020.

* cited by examiner

METHOD AND DEVICE FOR WIRELESS COMMUNICATION IN A FIRST NODE AND BASE STATION

CROSS REFERENCE TO RELATED APPLICATION

This application claims the priority benefit of Chinese Patent Application Serial Number 201810302835.0, filed on Apr. 6, 2018, the full disclosure of which is incorporated herein by reference.

BACKGROUND

Technical Field

The disclosure relates to transmission methods and devices in wireless communication systems, and in particular to a method and device for communication supporting LBT (Listen Before Talk).

Related Art

The application scenarios of future wireless communication systems become more and more diversified. Different application scenarios have different performance requirements for the system. To meet the different performance needs in various application scenarios, the research project on access to unlicensed spectrum under NR (New Radio) was approved at the 75th Plenary Session of Radio Access Network (RAN) of the 3rd Generation Partner Project (3GPP).

In the LAA (License Assisted Access) project of the LTE (Long Term Evolution), the transmitter (the base station and the user equipment) need to perform LBT (Listen Before Talk) before transmitting data on the unlicensed spectrum to ensure no interference with the other data that is wirelessly transmitted on the unlicensed spectrum. During the Cat 4 LBT (the fourth-type LBT, see 3GPP TR 36.889), the transmitter performs a backoff after a certain defer duration. The time of the backoff is counted in units of CCA (Clear Channel Assessment) time slot period. The number of the time slot period of the backoff is obtained by randomly selection in the the CWS (Contention Window Size) by the transmitter.

Massive MIMO (Multi-Input Multi-Output) is an important technology feature in the NR system. The transmission efficiency or transmission reliability of the massive MIMO system may be further improved by increasing the number of antennas.

SUMMARY

Based on Massive MIMO, the transmitter may perform a beam specific LBT to increase the transmission opportunity. The inventors found through research that the transmitter may perform LBT by using multiple beams at the same time. How to maintain the cooperation among the multiple beams LBT is a problem to be solved.

In view of the above findings, the present disclosure discloses a solution. It should be noted that, in the case of no conflict, the embodiments and the features of the embodiments in the user equipment of the present disclosure can be applied to the base station, and vice versa. Further, although the original intent of the present disclosure is directed to the massive MIMO communication, the methods and apparatus of the present disclosure are also applicable to single antenna communications.

The present disclosure provides a method in a first node for wireless communication, including:

performing a first listening in a first time domain resource of a first frequency domain resource;

transmitting a second wireless signal in a second time domain resource of the first frequency domain resource;

performing a first supplementary listening in a third time domain resource of the first frequency domain resource; and transmitting a first wireless signal in a fourth time domain resource of the first frequency domain resource;

wherein a first receiving parameter group is used for the first listening and the first supplementary listening; the first wireless signal is transmitted by a first antenna port group; the first receiving parameter group is associated with the first antenna port group; the first supplementary listening comprises decrementing a first counter based on the first listening; the first time domain resource, the second time domain resource, the third time domain resource and the fourth time domain resource are in a time domain order.

In the prior art, after the transmitter transmits a wireless signal on a given frequency domain resource, it needs to start a new the LBT on the given frequency domain resource. In the above method of the disclosure, the first supplementary listening after the transmission of the second wireless signal is a continuation of the first listening before the transmission of the second wireless signal, rather than a new LBT. Compared with the prior art, the above method of the disclosure, can reduce the delay caused by the LBT, increase the transmission opportunity, and improve the transmission efficiency.

In one embodiment, the method in a first node for wireless communication further includes:

performing a second listening in the first time domain resource of the first frequency domain resource;

wherein the second receiving parameter group is used for the second listening; the second wireless signal is transmitted by a second antenna port group; the second receiving parameter group is associated with the second antenna port group; the second listening comprises decrementing a second counter to zero.

In one embodiment, the receiving parameter group employed by the second listening is different from the first receiving parameter group.

In one embodiment, the method in a first node for wireless communication further includes: initializing the value of the first counter as a first integer; the second listening comprises initializing the value of the second counter as a second integer.

As an embodiment, the foregoing methods can ensure that the first listening and the second listening respectively correspond to two independent LBTs. The two independent LBTs independently initialize the counters, and perform counting independently according to the listening result.

The above methods can provide more transmission opportunities for the first node. The first node can immediately occupy the first frequency domain resource to transmit a wireless signal when the channel in the first frequency domain resource is determined being idle by either one of the first listening and the second listening.

In one embodiment, the method in a first node for wireless communication further includes:

performing a third listening in the third time domain resource of the first frequency domain resource; and transmitting a wireless signal in the fourth time domain resource of the first frequency domain resource;

wherein the second receiving parameter group is used for the third listening; the third wireless signal is transmitted by a third antenna port group; the second receiving parameter group is associated with the third antenna port group; the third listening is performed in a third time domain sub-resource right before the transmission time of the first wireless signal; the third time domain sub-resource belongs to the third time domain resource.

As an embodiment, the foregoing aspect can ensure that the third listening and the first supplementary listening end simultaneously, so that the first wireless signal and the third wireless signal can be simultaneously transmitted, thereby improving transmission efficiency.

As an embodiment, any one of the second antenna port group is spatially relevant to any of the third antenna port group.

In one embodiment of the method in a first node for wireless communication, at least one of the first listening and the first supplementary listening:

performs energy detection in the first frequency domain resource until obtaining an idle first-type time slot In one embodiment, the first-type duration is 25 us.

In one embodiment, the first-type duration is 43 us.

In one embodiment, the first-type duration is 79 us.

In one embodiment of the method in a first node for wireless communication, at least one of the first listening and the first supplementary listening:

performs energy detection in the first frequency domain resource; the counting of the first counter is greater than zero; the first counter is decremented by one when an idle second-type time slot is obtained, otherwise the counting of the first counter is maintained.

In one embodiment of the method in a first node for wireless communication, the first node is a user equipment.

In one embodiment of the method in a first node for wireless communication, the first node is a base station.

In one embodiment, the method in a first node for wireless communication further includes:

receiving a first signaling;

wherein the first node is a user equipment; the first signaling is used to indicate the first receiving parameter group, or the first signaling is used to indicate the first antenna port group.

The present disclosure provides a first node for wireless communication, including:

a first receiver performing a first listening in a first time domain resource of a first frequency domain resource, and performing a first supplementary listening in a third time domain resource of the first frequency domain resource; and a first transmitter transmitting a second wireless signal in a second time domain resource of the first frequency domain resource, and transmitting a first wireless signal in a fourth time domain resource of the first frequency domain resource;

wherein a first receiving parameter group is used for the first listening and the first supplementary listening; the first wireless signal is transmitted by a first antenna port group; the first receiving parameter group is associated with the first antenna port group; the first supplementary listening comprises decrementing a first counter based on the first listening; the first time domain resource, the second time domain resource, the third time domain resource and the fourth time domain resource are in a time domain order.

In one embodiment of the first node for wireless communication, the first receiver further performs a second listening in the first time domain resource of the first frequency domain resource; wherein the second receiving parameter group is used for the second listening; the second wireless signal is transmitted by a second antenna port group; the second receiving parameter group is associated with the second antenna port group; the second listening comprises decrementing a second counter to zero.

In one embodiment of the first node for wireless communication, the first listening comprises initializing the value of the first counter as a first integer; the second listening comprises initializing the value of the second counter as a second integer.

In one embodiment of the first node for wireless communication, the first receiver further performs a third listening in the third time domain resource of the first frequency domain resource; the first transmitter further transmits a third wireless signal in the fourth time domain resource of the first frequency domain resource; wherein the second receiving parameter group is used for the third listening; the third wireless signal is transmitted by a third antenna port group; the second receiving parameter group is associated with the third antenna port group; the third listening is performed in a third time domain sub-resource right before the transmission time of the first wireless signal; the third time domain sub-resource belongs to the third time domain resource.

In one embodiment of the first node for wireless communication, at least one of the first listening and the first supplementary listening:

performs energy detection in the first frequency domain resource until an idle first-type time slot is obtained.

In one embodiment of the first node for wireless communication, at least one of the first listening and the first supplementary listening:

performs energy detection in the first frequency domain resource; the counting of the first counter is greater than zero; the first counter is decremented by one when obtaining an idle second-type time slot is obtained, otherwise the counting of the first counter is maintained.

In one embodiment of the first node for wireless communication, the first node is a user equipment.

In one embodiment of the first node for wireless communication, the first node is a base station.

In one embodiment of the first node for wireless communication, further includes:

the first receiver receiving a first signaling;

wherein the first node is a user equipment; the first signaling is used to indicate the first receiving parameter group, or the first signaling is used to indicate the first antenna port group.

As an embodiment, the present disclosure has the following advantages compared with the conventional solution.

The two listening before and after a wireless transmission on a given frequency domain resource can form a complete LBT, thereby reducing the delay required by the LBT, increases the transmission opportunity, and improves the transmission efficiency.

The start time of the listening may be adjusted to ensure that multiple transmission beams that are associated can be simultaneously transmit wireless signals, thereby making full use of the multiplexing gain of multiple antennas, and improving transmission efficiency.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if there is no conflict.

Embodiment 1

Figure 1:
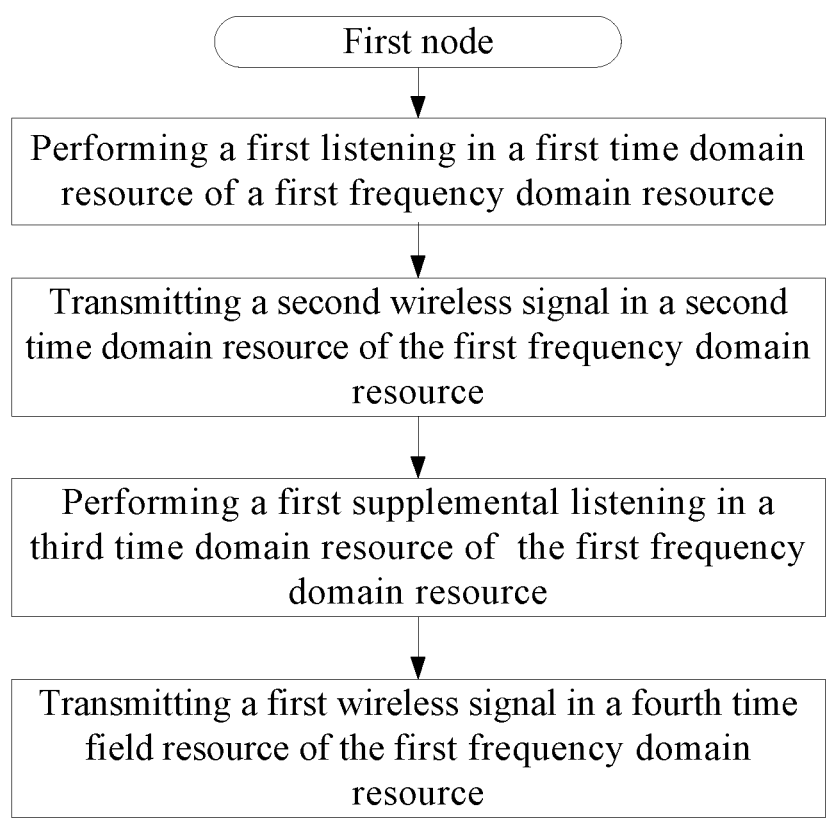
FIG. 1 illustrates a flowchart of a first node according to one embodiment of the present disclosure.

Embodiment 1 illustrates a flowchart of a first node, as shown in FIG. 1.

In Embodiment 1, the first node first performs a first listening in a first time domain resource of a first frequency domain resource, then transmits a second wireless signal in a second time domain resource of the first frequency domain resource, then performs a first supplementary listening in a third time domain resource of the first frequency domain resource, and then transmitting a first wireless signal in a fourth time domain resource of the first frequency domain resource.

In Embodiment 1, a first receiving parameter group is used for the first listening and the first supplementary listening; the first wireless signal is transmitted by a first antenna port group; the first receiving parameter group is associated with the first antenna port group; the first supplementary listening comprises decrementing a first counter based on the first listening; the first time domain resource, the second time domain resource, the third time domain resource and the fourth time domain resource are in a time domain order.

In one embodiment, the first frequency domain resource is deployed in an unlicensed spectrum.

In one embodiment, the first frequency domain resource includes a system bandwidth of one carrier.

In one embodiment, the first frequency domain resource includes a BWP (BandWidth Part).

In one embodiment, the first frequency domain resource includes a plurality of subcarrier groups. Each of the plurality of subcarrier groups includes a plurality of subcarriers. The subcarriers in each of the plurality of subcarrier groups are continuous in the frequency domain. At least two of the plurality of subcarrier groups are discontinuous in the frequency domain.

In one embodiment, the value of the first counter is greater than zero at the end of the first listening.

In one embodiment, according to the first listening, the first antenna port group cannot be used for wireless transmission in the second time domain resource of the first frequency domain resource.

In one embodiment, according to the first listening and the first supplementary listening, the first antenna port group cannot be used for wireless transmission in the second time domain resource of the first frequency domain resource.

In one embodiment, according to the first listening, the first frequency domain resource may not be considered idle for the first antenna port group.

In one embodiment, according to the first listening and the first supplementary listening, the first frequency domain resource is determined as being idle for the first antenna ports group.

In one embodiment, the first frequency domain resource is deployed in an unlicensed spectrum.

In one embodiment, the first time domain resource, the second time domain resource, the third time domain resource, and the fourth time domain resource are arranged in the time domain from first to last.

In one embodiment, the first time domain resource, the second time domain resource, the third time domain resource, and the fourth time domain resource are continuous in the time domain. In the first time domain resource and the third time domain resource, the first node does not transmit a wireless signal on the first frequency domain resource.

In one embodiment, any two of the first time domain resource, the second time domain resource, the third time domain resource, and the fourth time domain resource are orthogonal in the time domain (i.e. no overlap).

In one embodiment, the first supplemental listening includes continuing to decrement the first counter to zero at the end of the first listening.

In one embodiment, the first supplementary listening including decrementing a first counter based on the first listening refers to that the first listening includes decrement the first counter, and the first supplemental listening includes continuing to decrement the first counter from the counting at the end of the first listening.

In one embodiment, the first supplementary listening including decrementing a first counter based on the first listening refers to that the counting of the first counter does not change in the first listening, and the first supplemental listening includes continuing to subtract the counting of the first counter from the counting at the end of the first listening.

In one embodiment, the first node is a user equipment, and the first wireless signal and the second wireless signal occupy a PUSCH (Physical Uplink Shared Channel).

In one embodiment, the first node is a user equipment, and the first wireless signal occupies a PUSCH or PUCCH (Physical Uplink Control Channel), and the second wireless signal occupies PUSCH or PUCCH.

In one embodiment, the first node is a base station, and the first wireless signal and the second wireless signal occupy a PDSCH (Physical Downlink Shared Channel).

In one embodiment, the first node is a base station, and the first wireless signal occupies a PDSCH, a PDCCH (Physical Downlink Control Channel), or an EPDCCH (Enhanced PDCCH), and the second wireless signal occupies a PDCCH or an EPDCCH.

In one embodiment, the first counter keeps the first integer unchanged in the first listening; the counting of at the end of the first listening is the first integer, and the first supplementary listening resumes decrementing the counter of the first counter from the first integer.

In one embodiment, the first listening includes decrementing the first counter form the first integer to the second integer; the counting of at the end of the first listening is the second integer and the first supplementary listening resumes decrementing the counter of the first counter from the second integer.

In one embodiment, the first node does not occupy the second time domain resource in the first frequency domain resource.

In one embodiment, the transmission power of the first node remains zero in the second time domain resource of the first frequency domain resource.

In one embodiment, the first supplemental listening is used to determine that the first frequency domain resource is idle.

In one embodiment, the first supplemental listening is not used to determine that the first frequency domain resource is idle.

In one embodiment, that the first frequency domain resource is idle refers to that the first node is capable of transmitting a wireless signal in the first frequency domain resource immediately.

In one embodiment, that the first frequency domain resource is idle refers to that the first node does not transmit a wireless signal in the first frequency domain resource immediately; the first node is capable of performing wireless transmission in the case that the first frequency domain resource is determined to be idle in one second-type duration when the first node is ready to transmit in the first frequency domain resource, and the first frequency domain resource is determined to be idle when all of the second-type durations in one first-type duration prior to the wireless transmission.

In one embodiment, the first supplementary listening used to determine that the first frequency domain resource is idle includes the first node can immediately transmit a wireless signal through the first antenna port group in the first frequency domain resource after the first supplementary listening ends.

In one embodiment, the first supplementary listening used to determine that the first frequency domain resource is idle includes after the first supplementary listening ends, the first node does not immediately transmit a wireless signal through the first antenna port group in the first frequency domain resource. When the first node is ready to transmit in the first frequency domain resource, the first node is capable of performing wireless transmission in the case that the first frequency domain resource is determined as being idle in one second-type duration with application of the first receiving parameter group, and the first frequency domain resource is determined as being idle in all of the second-type durations in one first-type duration right before the wireless transmission with application of the first receiving parameter group.

In one embodiment, the first-type duration is greater than the second-type duration.

In one embodiment, for a part of one second-type duration, if the received power of the first node in the first frequency domain resource is less than a pre-determined threshold, the first frequency domain resource in the first-type duration is determined as being idle.

In one embodiment, for one second-type duration, if the received power of the first node in the first frequency domain resource is less than a pre-determined threshold, the first frequency domain resource in the first-type duration is determined as being idle.

In one embodiment, the pre-determined threshold is configurable.

In one embodiment, the pre-determined threshold is fixed (i.e., not configurable).

In one embodiment, the pre-determined threshold is pre-defined.

In one embodiment, the unit of the pre-determined threshold is dBm (millimeters).

In one embodiment, the unit of the pre-determined threshold is mW (milliwatts).

In one embodiment, the received power is based on EIRP (Effective Isotropic Radiated Power).

In one embodiment, the received power includes a receiving beamforming gain.

In one embodiment, the received power does not include a receiving beamforming gain.

In one embodiment, the second-type duration is 9 us (microseconds) and the part of one second-type duration is 4 us.

In one embodiment, the second-type duration does not exceed 9 us (microseconds) and the part of one second-type duration does not exceed 4 us.

In one embodiment, the first-type duration is 25us.

In one embodiment, the first-type duration is 43 us.

In one embodiment, the first-type duration is 79 us.

In one embodiment, the duration of the first time domain resource in the time domain is less than the duration of one multicarrier symbol.

In one embodiment, the duration of the third time domain resource in the time domain is less than the duration of one multicarrier symbol.

In one embodiment, the duration of the first time domain resource in the time domain is greater than the duration of one multicarrier symbol.

In one embodiment, the duration of the third time domain resource in the time domain is greater than the duration of one multicarrier symbol.

In one embodiment, the second time domain resource and the fourth time domain resource respectively include a positive integer number of multicarrier symbols.

In one embodiment, the multicarrier symbols are OFDM (Orthogonal Frequency Division Multiplexing) symbols.

In one embodiment, the multicarrier symbols are SC-FDMA (Single Carrier Frequency Division Multiplexing Access) symbols.

In one embodiment, the multicarrier symbols are FBMC (Filter Bank Multi-Carrie) symbols.

In one embodiment, the multicarrier symbols include a CP (Cyclic Prefix).

Embodiment 2

Figure 2:
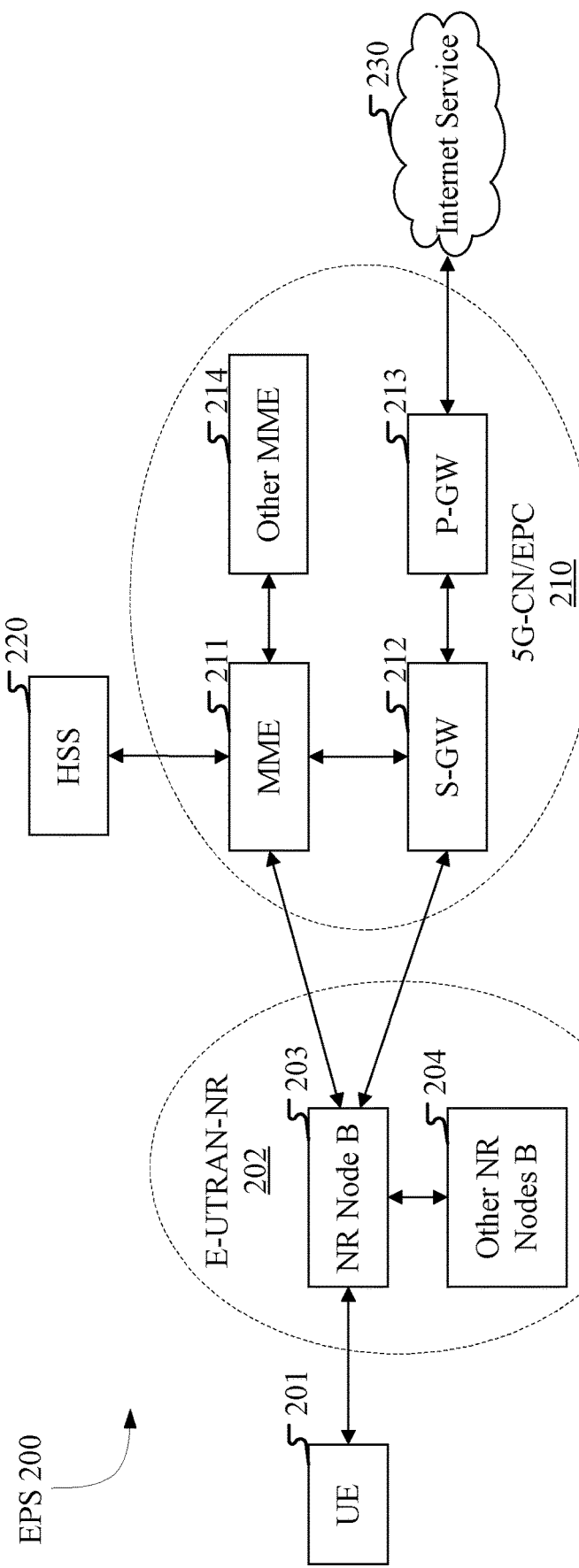
FIG. 2 illustrates a schematic diagram of the network architecture according to one embodiment of the present disclosure.

Embodiment 2 illustrates a schematic diagram of the network architecture, as shown in FIG. 2.

FIG. 2 illustrates a network architecture 200 of LTE (Long-Term Evolution), LTE-A (Long-Term Evolution Advanced), and 5G systems. The 5G, LTE-A or LTE network architecture 200 may be called an Evolved Packet System (EPS) 200. The EPS 200 may include one or more UEs 201, an E-UTRAN-NR (Evolved Universal Terrestrial Radio Access Network-New RADIO), a 5G-CN (5G-Core Network) 210, Home Subscriber Server (HSS) 220, and an Internet service 230. UMTS corresponds to Universal Mobile Telecommunications System. The EPS 200 may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The E-UTRAN-NR 202 includes an NR (New Radio) node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a TRP (Transmit Receive Point) or some other appropriate terms. The gNB 203 provides an access point of the 5G-CN/EPC210 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client or some other appropriate terms. The gNB 203 is connected to the 5G-CN/EPC 210 via an Si interface. The 5G-CN/EPC 210 includes an MME (Mobility Management Entity) 211, other MMES 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the first node in the disclosure.

In one embodiment, the gNB203 corresponds to the first node in the disclosure.

In one embodiment, the UE 201 supports wireless communication for the data transmission on unlicensed spectrum.

In one embodiment, the gNB20 supports wireless communication for the data transmission on unlicensed spectrum.

In one embodiment, the UE 201 supports D2D communication.

In one embodiment, the gNB203 supports D2D communication.

Embodiment 3

Figure 3:
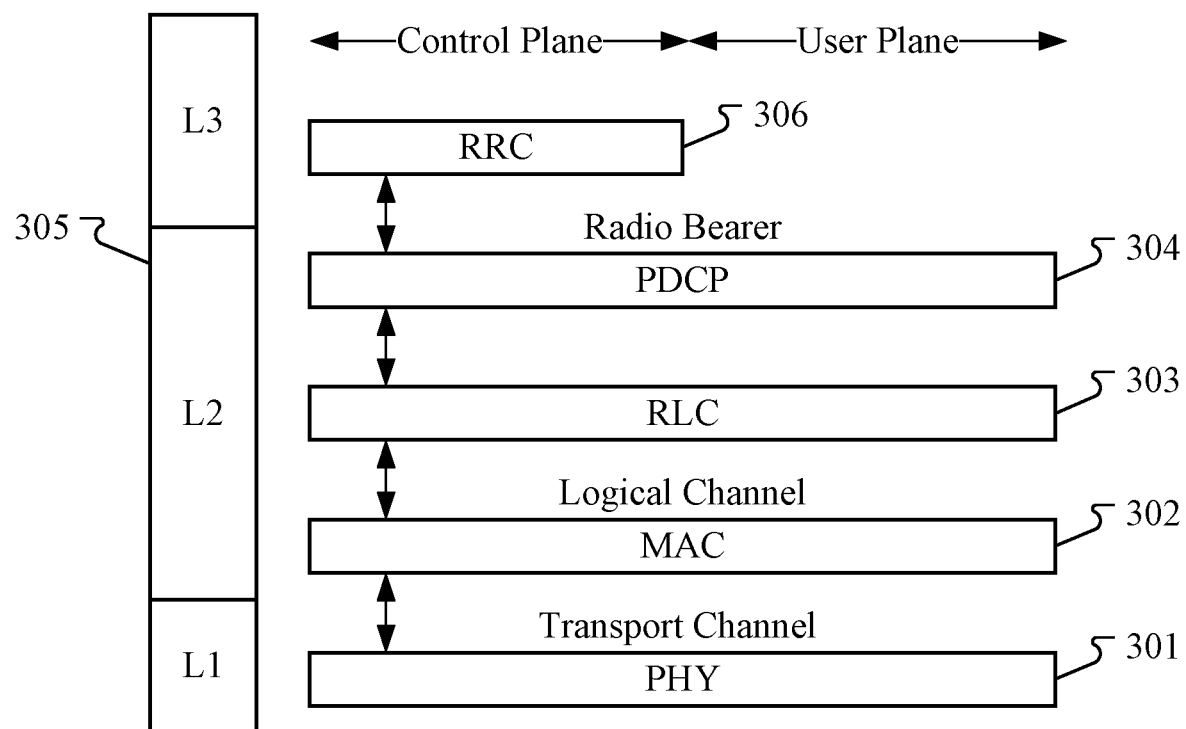
FIG. 3 illustrates a schematic diagram for a radio protocol architecture of a user plane and a control plane according to one embodiment of the disclosure.

Embodiment 3 illustrates a schematic diagram for a radio protocol architecture of a user plane and a control plane, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in the figure, the UE may include several higher layers above the L2 layer 305, including a network layer (i.e. IP layer) terminated at the P-GW 213 on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overhead. The PDCP sublayer 304 provides security by encrypting packets and provides support for UE handover between gNBs. The RLC sublayer 303 provides segmentation and reassembling of higher-layer packets, retransmission of lost packets, and reordering of lost packets so as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one embodiment, the wireless protocol architecture shown in FIG. 3 is applicable to the first node in the disclosure. The first node is a user equipment.

In one embodiment, the wireless protocol architecture shown in FIG. 3 is applicable to the first node in the disclosure. The first node is a base station.

In one embodiment, the first signaling in the disclosure is generated by the PHY 301.

In one embodiment, the physical layer signaling in the disclosure is generated by the PHY 301.

In one embodiment, the first signaling in the disclosure is generated by the MAC sublayer 302.

In one embodiment, the first signaling in the disclosure is generated by the RRC sublayer 306.

Embodiment 4

Figure 4:
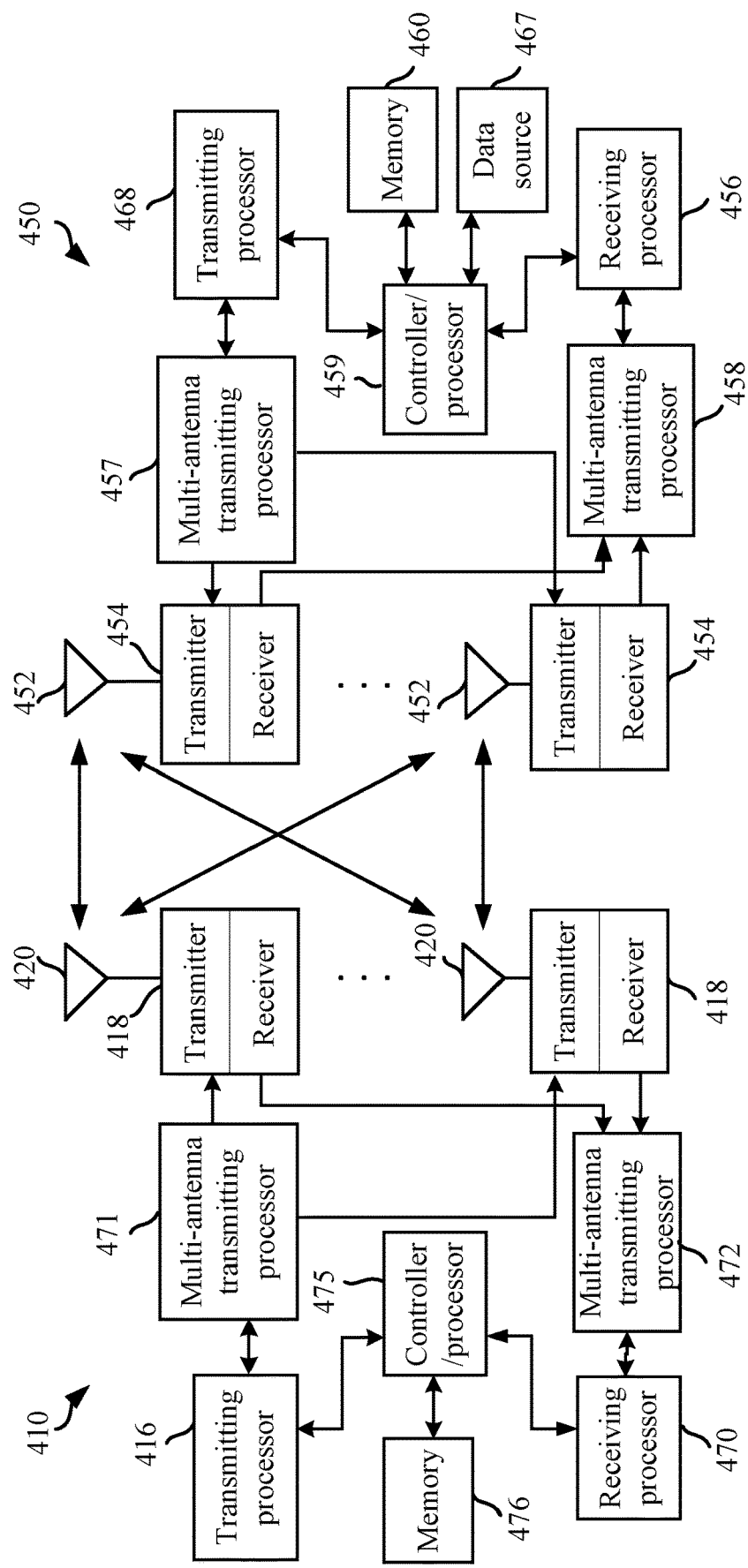
FIG. 4 illustrates a schematic diagram for a NR (New Radio) node and a user equipment (UE) according to one embodiment of the present disclosure.

Embodiment 4 illustrates a schematic diagram for a NR (New Radio) node and a user equipment (UE), as shown in FIG. 4. FIG. 4 is a block diagram of a gNB 410 in communication with a UE 450 in an access network.

The gNB 410 may include a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In Downlink (DL) transmission, in the gNB 410, the upper layer packets from the core network are provided to controller/processor 475. The controller/processor 475 performs functions of L2 layer. In downlink transmission, the controller/processor 475 provides header compression, encryption, packet segmentation and reordering, multiplexing between a logical channel and a transport channel, and radio resource allocation for the UE 450 based on various priority metrics. The controller/processor 475 is also in charge of HARQ operation, retransmission of lost packets, and signalings to the UE450. The transmitting processor 416 and the multi-antenna transmitting processor 471 perform signal processing functions of L1 layer (that is, PHY). The transmitting processor 416 performs coding and interleaving, so as to facilitate FEC (Forward Error Correction) at the UE 450 side, and mapping of signal clusters based on different modulation schemes (i.e., BPSK, QPSK, M-PSK, M-QAM, etc.). The multi-antenna transmit processor 471 performs digital spatial precoding on the encoded and modulated symbols, including codebook based precoding and non-codebook based precoding, and beamforming to generate one or more spatial streams. The transmitting processor 416 then maps each spatial stream to the subcarrier for multiplexing with reference signals (e.g., pilots) in the time domain and/or frequency domain. Then the inverse fast Fourier transform (IFFT) is then used to generate the physical channel carrying the time-domain multi-carrier symbol stream. The multi-antenna transmit processor 471 then performs the precoding/beamforming for the time-domain multi-carrier symbol stream. Each transmitter 418 converts the baseband multicarrier symbol stream provided by the multi-antenna transmitting processor 471 into a radio frequency stream, which is then provided to the antenna 420.

In Downlink (DL) transmission, in the UE 450, each receiver 454 receives a signal through the respective antenna 452. Each receiver 454 recovers the information modulated onto the radio frequency carrier, and converts the RF stream into a baseband multi-carrier symbol stream which is then provided to the receiving processor 456. The receiving processor 456 and the multi-antenna receiving processor 458 performs various signal processing functions of the L1 layer. The multi-antenna receiving processor 458 performs the reception analog precoding/beamforming operations on the baseband multicarrier symbol streams received from the receiver 454. The receiving processor 456 converts the reception analog precoded/beamformed baseband multicarrier symbol streams from time domain to frequency domain using Fast Fourier Transform (FFT). In the frequency domain, the physical layer data signal and the reference signal are demultiplexed by the receiving processor 456. The reference signal is used for channel estimation. The data signal is recovered as any spatial stream destined for the UE 450 after detection by the multi-antennas in the multi-antenna receiving processor 458. The symbols on each spatial stream are demodulated and recovered in receiving processor 456 and a soft decision is generated. The receiving processor 456 then decodes and deinterleaves the soft decision to recover the upper layer data and control signals transmitted by the gNB 410 on the physical channel. The upper layer data and control signals are then provided to the controller/processor 459. The controller/processor 459 performs functions of L2 layer. The controller/processor 459 may be connected to the memory 460 that stores program codes and data. The memory 460 may be called a computer readable medium. In DL transmission, the controller/processor 459 performs demultiplexing, packet reassembly, decryption, header decompression, and control signal processing between the transmission and logical channels to recover upper layer packets from the core network. The upper layer packet is then provided to all protocol layers above the L2 layer. The various control signals can also be provided to L3 for L3 processing. The controller/processor 459 is also responsible for error detection using an acknowledgement (ACK) and/or negative acknowledgement (NACK) protocol to support HARQ operations.

In Uplink (UL) transmission, in the UE 450, the data source 467 is used to provide the upper layer data packets to controller/processor 459. The data source 467 represents all protocol layers above the L2 layer. Similar to the transmission function at gNB 410 described in the DL transmission, the controller/processor 459 performs header compression, encryption, packet segmentation and reordering, and multiplexing between logical and transmission channels based on the wireless resource allocation of the gNB 410, implementing the L2 layer function for the user plane and the control plane. The controller/processor 459 is also in charge of HARQ operations, retransmission of lost packets, and signalings to the gNB410. The transmitting processor 468 performs modulation mapping and channel coding processing. The multi-antenna transmit processor 457 performs digital multi-antenna spatial precoding, including codebook based precoding and non-codebook based precoding, and beamforming processing. The transmitting processor 468 then modulates the generated spatial stream into a multi-carrier/single-carrier symbol stream. After an analog precoding/beamforming operation in the multi-antenna transmitting processor 457 is performed, the steam is then provided to the antennas 452 via the transmitter 454. Each transmitter 454 first converts the baseband symbol stream provided by the multi-antenna transmitting processor 457 into a radio frequency symbols stream, which is then provided to the antenna 452.

In Uplink (UL) transmission, the function at gNB 410 is similar to the receiving function at UE 450 described in the DL transmission. Each receiver 418 receives a radio frequency signal through the respective antenna 420, converts the received radio frequency signal into a baseband signal, and provides the baseband signal to the multi-antenna receiving processor 472 and the receiving processor 470. The multi-antenna receiving processor 472 and the receiving processor 470 jointly performs the function of the L1 layer.

The controller/processor 475 performs L2 layer function. The controller/processor 475 can be associated with the memory 476 that stores program code and data. The memory 476 may be called a computer readable medium. In UL transmission, the controller/processor 475 performs demultiplexing, packet reassembly, decryption, header decompression, and control signal processing between the transmission and logical channels to recover upper layer data packets from the UE 450. The upper layer data packets from controller/processor 475 can be provided to the core network. The controller/processor 475 is also responsible for error detection using ACK and/or NACK protocols to support HARQ operations.

In one embodiment, the UE 450 device includes at least one processor and at least one memory. The at least one memory includes computer program codes. The at least one memory and the computer program codes are configured to be used in collaboration with the at least one processor. The UE 450 device at least performs a first listening in a first time domain resource of a first frequency domain resource, transmits a second wireless signal in a second time domain resource of the first frequency domain resource, performs a first supplementary listening in a third time domain resource of the first frequency domain resource, and transmits a first wireless signal in a fourth time domain resource of the first frequency domain resource; wherein a first receiving parameter group is used for the first listening and the first supplementary listening; the first wireless signal is transmitted by a first antenna port group; the first receiving parameter group is associated with the first antenna port group; the first supplementary listening comprises decrementing a first counter based on the first listening; the first time domain resource, the second time domain resource, the third time domain resource and the fourth time domain resource are in a time domain order.

In one embodiment, the UE 450 includes a memory that stores a computer readable instruction program. The computer readable instruction program generates an action when executed by at least one processor. The action includes performing a first listening in a first time domain resource of a first frequency domain resource, transmitting a second wireless signal in a second time domain resource of the first frequency domain resource, performing a first supplementary listening in a third time domain resource of the first frequency domain resource, and transmitting a first wireless signal in a fourth time domain resource of the first frequency domain resource; wherein a first receiving parameter group is used for the first listening and the first supplementary listening; the first wireless signal is transmitted by a first antenna port group; the first receiving parameter group is associated with the first antenna port group; the first supplementary listening comprises decrementing a first counter based on the first listening; the first time domain resource, the second time domain resource, the third time domain resource and the fourth time domain resource are in a time domain order.

In one embodiment, the gNB 410 includes at least one processor and at least one memory. The at least one memory includes computer program codes. The at least one memory and the computer program codes are configured to be used in collaboration with the at least one processor. The gNB 410 at least performs a first listening in a first time domain resource of a first frequency domain resource, transmits a second wireless signal in a second time domain resource of the first frequency domain resource, performs a first supplementary listening in a third time domain resource of the first frequency domain resource, and transmits a first wireless signal in a fourth time domain resource of the first frequency domain resource; wherein a first receiving parameter group is used for the first listening and the first supplementary listening; the first wireless signal is transmitted by a first antenna port group; the first receiving parameter group is associated with the first antenna port group; the first supplementary listening comprises decrementing a first counter based on the first listening; the first time domain resource, the second time domain resource, the third time domain resource and the fourth time domain resource are in a time domain order.

In one embodiment, the gNB 410 includes a memory that stores a computer readable instruction program. The computer readable instruction program generates an action when executed by at least one processor. The action includes performing a first listening in a first time domain resource of a first frequency domain resource, transmitting a second wireless signal in a second time domain resource of the first frequency domain resource, performing a first supplementary listening in a third time domain resource of the first frequency domain resource, and transmitting a first wireless signal in a fourth time domain resource of the first frequency domain resource; wherein a first receiving parameter group is used for the first listening and the first supplementary listening; the first wireless signal is transmitted by a first antenna port group; the first receiving parameter group is associated with the first antenna port group; the first supplementary listening comprises decrementing a first counter based on the first listening; the first time domain resource, the second time domain resource, the third time domain resource and the fourth time domain resource are in a time domain order.

In one embodiment, the gNB 410 corresponds to the first node in the disclosure.

In one embodiment, the UE450 corresponds to the first node in the disclosure.

In one embodiment, the first node in the disclosure is a user equipment. The antenna 452, the receiver 454, and the receiving processor 456 are used to perform the first listening and the first supplementary listening. The antenna 452, the receiver 454, and the transmitter processor 468 are used to transmit the first wireless signal and the second wireless signal.

In one embodiment, the first node in the disclosure is a user equipment. At least one of the multi-antenna receiving processor 458 and the controller/processor 459 is used to perform the first listening and the first supplementary listening.

In one embodiment, the first node in the disclosure is a user equipment. The multi-antenna transmitting processor 458 is used to transmit the first wireless signal and the second wireless signal.

In one embodiment, the first node in the disclosure is a base station. The antenna 420, the receiver 418, and the receiving processor 470 are used to perform the first listening and the first supplementary listening. The antenna 420, the receiver 418, and the transmitting processor 416 are used to transmit the first wireless signal and the second wireless signal.

In one embodiment, the first node in the disclosure is a base station. At least one of the multi-antenna receiving processor 472 and the controller/processor 475 is used to perform the first listening and the first supplementary listening.

In one embodiment, the first node in the disclosure is a base station. The multi-antenna transmitting processor 471 is used to transmit the first wireless signal and the second wireless signal.

In one embodiment, the first node in the disclosure is a base station. The antenna 452, the receiver 454 and the receiving processor 456 are used to receive the first signaling.

Embodiment 5

Figure 5:
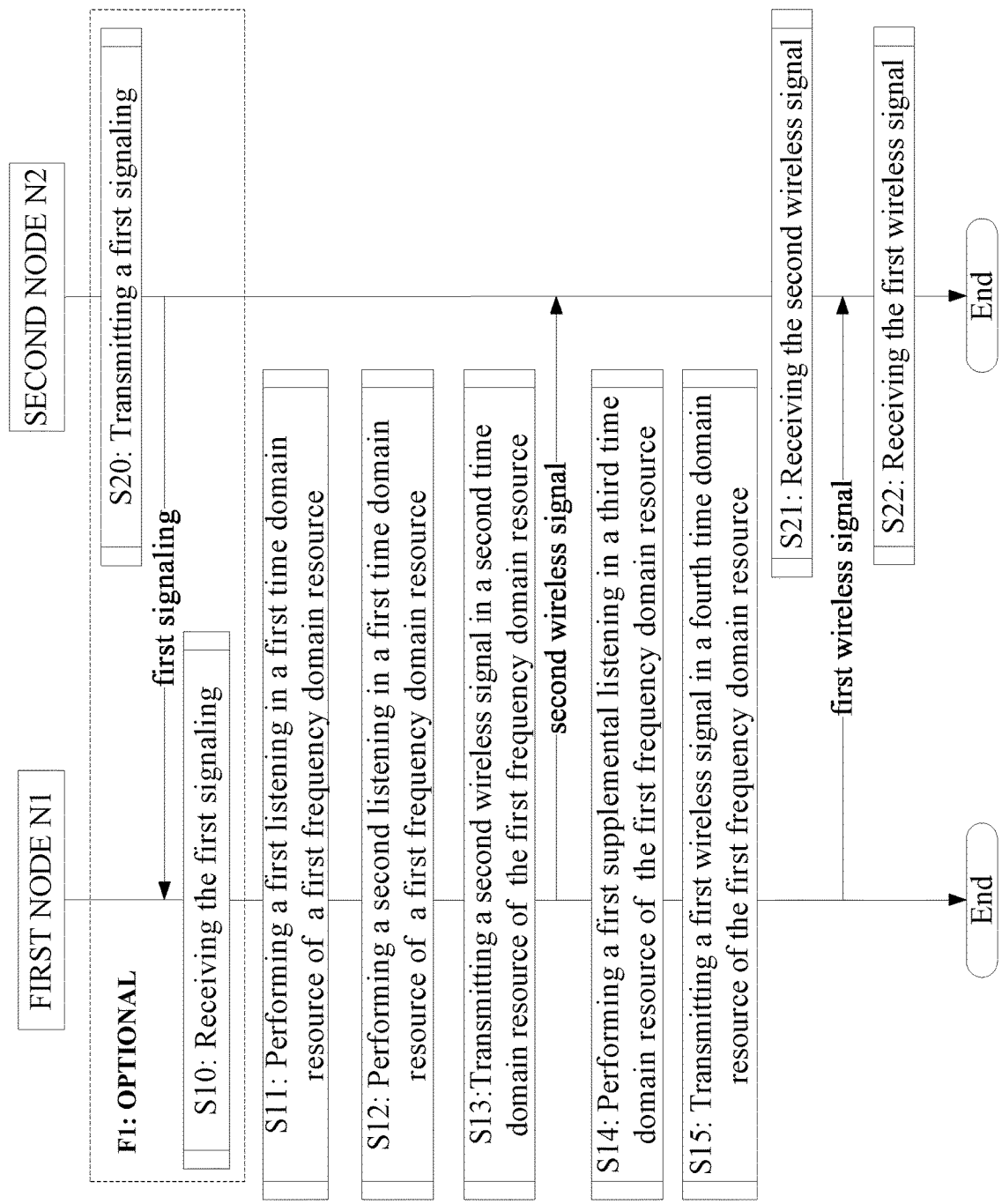
FIG. 5 illustrates a flow chart for wireless transmission for listening according to one embodiment of the present disclosure.

Embodiment 5 illustrates a flow chart for wireless transmission for listening, as shown in FIG. 5. In FIG. 5, the first node N1 is a user equipment, and the second node N2 is the maintenance base station of the serving cell of the first node N1; or the first node N1 is a base station, the second node N2 is a user equipment, and the first node N1 is a maintenance base station of the serving cell of the second node N2. The steps in the block F1 in FIG. 5 are optional, and are applicable when the first node N1 is a user equipment.

For the first node N1, step S11 involves performing a first listening in a first time domain resource of a first frequency domain resource; step S12 involves performing a second listening in a first time domain resource of a first frequency domain resource; step S13 involves transmitting a second wireless signal in a second time domain resource of the first frequency domain resource; step S14 involves performing a first supplementary listening in a third time domain resource of the first frequency domain resource; and step S15 involves transmitting a first wireless signal in a fourth time domain resource of the first frequency domain resource;

For the second node N2, step S21 involves receiving a second wireless signal; step S22 involves receiving the first wireless signal.

In Embodiment 5, a first receiving parameter group is used for the first listening and the first supplementary listening; the first wireless signal is transmitted by a first antenna port group; the first receiving parameter group is associated with the first antenna port group; the first supplementary listen comprises decrementing a first counter based on the first listening; the first time domain resource, the second time domain resource, the third time domain resource and the fourth time domain resource are in a time domain order. The second receiving parameter group is used for the second listening; the second wireless signal is transmitted by a second antenna port group; the second receiving parameter group is associated with the second antenna port group; the second listening comprises decrementing a second counter to zero.

In one embodiment, according to the second listening, the second antenna port group can be used for wireless transmission in the second time domain resource of the first frequency domain resource.

In one embodiment, according to the second listening, the first frequency domain resource is considered idle for the second antenna port group.

In one embodiment, the second listening includes:
performing energy detection in the first frequency domain resource until an idle first-type time slot is obtained;
if the counting of the second counter is greater than zero, continuing preforming energy detection in the first frequency domain resource, decrementing the first counter by one when obtaining an idle second-type time slot, otherwise maintain the counting of the first counter; if an idle second-type time slot is obtained, the second counter is decremented by one, otherwise maintain the counting of the second counter.

In one embodiment, the first node N1 is a user equipment. The second node N2 transmits a first signaling in step S20. The first node N1 receives the first signaling in step S10. The first signaling is used to indicate the first receiving parameter group, or the first signaling is used to indicate the first antenna port group.

In one embodiment, the first signaling is used to indicate a first reference signal and a second reference signal. The first receiving parameter group and the second receiving parameter group are used to receive the first reference signal and the second reference signal respectively.

In one embodiment, the first signaling is used to indicate the first antenna port group and the second antenna port group. The first antenna port group and the second antenna port group are used to generate the beamforming vector of the first antenna port group and the beamforming vector of the second antenna port group respectively.

In one embodiment, the first signaling is a physical layer signaling.

In one embodiment, the first signaling is an RRC layer signaling.

In one embodiment, the first antenna port group and the second antenna port group respectively include a positive integer number of antenna ports.

In one embodiment, the first receiving parameter group and the second receiving parameter group respectively include a first beamforming vector and a second beamforming vector; the first beamforming vector is used for the energy detection in the first listening and the energy detection in the first supplemental listening; the second beamforming vector is used for the energy detection in the second listening.

In one embodiment, the first beamforming vector includes an analog beamforming vector; the second beamforming vector includes an analog beamforming vector.

In one embodiment, the first beamforming vector includes an analog beamforming vector and a digital beamforming vector; the first beamforming vector is a Kronecker product of the analog beamforming vector and the digital beamforming vector.

In one embodiment, the second beamforming vector includes an analog beamforming vector and a digital beamforming vector; the second beamforming vector is a Kronecker product of the analog beamforming vector and the digital beamforming vector.

In one embodiment, the first node N1 is a base station. The first beamforming vector and the second beamforming vector are used to transmit the beamforming vector of the first reference signal and the QCL (Quasi Co-Located) beamforming vector of the second reference signal.

In one embodiment, if a large-scale fading corresponding to a beam generated by one beamforming vector can be used to infer another large-scale fading corresponding to a beam generated by another beamforming vector, the beamforming vector and the other beamforming vector are QCL.

In one embodiment, the large-scale fading includes a maximum multipath delay.

In one embodiment, the large-scale fading includes a maximum Doppler shift.

In one embodiment, the first node N1 is a base station. The first beamforming vector and the second beamforming vector are used to transmit the first wireless signal and the second wireless signal.

In one embodiment, the first node N1 is a use equipment. The first beamforming vector and the second beamforming vector are used to receive the first reference signal and the second reference signal respectively.

In one embodiment, the first reference signal and the second reference signal respectively include a CSI-RSs (Channel Status Information Reference Signal) transmitted by a positive integer number of antenna ports.

In one embodiment, at least one of the first reference signal and the second reference signal includes a synchronization signal.

In one embodiment, the synchronization signal includes a PSS (Primary Synchronization Signal).

In one embodiment, the synchronization signal includes an SSS (Secondary Synchronization Signal).

In one embodiment, the first node N1 is a base station. The first receiving parameter group and the second receiving parameter group are respectively used to receive a third reference signal and a fourth reference signal.

In one embodiment, the third reference signal and the fourth reference signal respectively include an SRS (Sounding Reference Signal) transmitted by a positive integer number of antenna ports.

In one embodiment, the third reference signal and the fourth reference signal respectively include an DMRS (De-Modulation Signa) transmitted by a positive integer number of antenna ports.

In one embodiment, the third reference signal and the fourth reference signal respectively include the transmission of the first antenna port group and the second antenna port group.

In one embodiment, the first wireless signal is an output sequentially subjected to channel coding, scrambling, modulation mapper, layer mapper, precoding, Resource Element Mapper, and broadband symbol generation by a first bit block.

In one embodiment, the first wireless signal is an output subjected to channel coding, scrambling, modulation mapper, resource element mapper, and broadband symbol generation by a first bit block.

In one embodiment, the first bit block includes a TB (Transport Block).

In one embodiment, the first bit block includes one or more CBG (Code Block Group).

In one embodiment, the first signaling is used to indicate the first receiving parameter group and the second receiving parameter group.

In one embodiment, the first signal is an Uplink Grant DCI (Downlink Control Information).

In one embodiment, the first signaling is used to indicate the first antenna port group and the second antenna port group.

In one sub-embodiment of the foregoing embodiments, the first signaling is a physical layer signaling; the first signaling is used to indicate first configuration information and second configuration information; the first configuration information includes at least one of a time-frequency resource occupied by the first wireless signal, an MCS (Modulation and Coding Status) corresponding to the first wireless signal, and an RV (Redundancy Version) corresponding to the first wireless signal, an NDI (New Data Indicator) of the first wireless signal; the second configuration information includes at least one of a time-frequency resource occupied by the second wireless signal, an MCS corresponding to the second, wireless signal, an RV (Redundancy Version) corresponding to the second wireless signal at least one of an NDI (New Data Indicator) of the second wireless signal.

In one embodiment, the first signaling is higher layer signaling.

In one embodiment, the first signaling is an RRC (Radio Resource Control) layer signaling.

Embodiment 6

Figure 6:
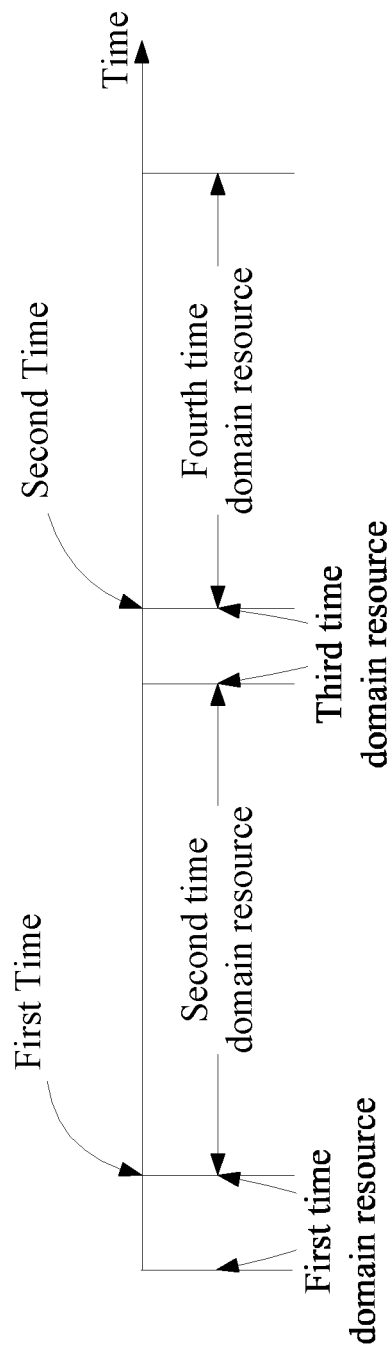
FIG. 6 illustrates a schematic diagram for a first time domain resource to a fourth time domain according to one embodiment of the present disclosure.

Embodiment 6 illustrates a schematic diagram for a first time domain resource to a fourth time domain, as shown in FIG. 6.

In Embodiment 6, the first time domain resource, the second time domain resource, the third time domain resource and the fourth time domain resource are in a time domain order. Any two of the first time domain resource, the second time domain resource, the third time domain resource, and the fourth time domain resource are orthogonal in the time domain (i.e. no overlap). In FIG. 6, the first time is the start transmission time of the second wireless signal, and the second time is the start transmission time of the first wireless signal.

In one embodiment, the duration of the first time domain resource in the time domain is less than the duration of one multi-carrier symbol.

In one embodiment, the duration of the third t time domain resource in the time domain is less than the duration of one multi-carrier symbol.

In one embodiment, the duration of the first time domain resource in the time domain is greater than the duration of one multi-carrier symbol.

In one embodiment, the duration of the third time domain resource in the time domain is greater than the duration of one multi-carrier symbol.

In one embodiment, the second time domain resource and the fourth time domain resource respectively include a positive integer number of multi-carrier symbols.

In one embodiment, the multicarrier symbols are OFDM symbols.

In one embodiment, the multicarrier symbols are SC-FDMA symbols.

In one embodiment, the multicarrier symbols are FBMC symbols.

In one embodiment, the multicarrier symbols include a CP.

In one embodiment, no complete multicarrier symbol exists between any two adjacent time domain resources of the first time domain resource, the second time domain resource, the third time domain resource, and the fourth time domain resource.

In one embodiment, any two adjacent time domain resources of the first time domain resource, the second time domain resource, the third time domain resource, and the fourth time domain resource are continuous in time domain.

Embodiment 7

Figure 7:
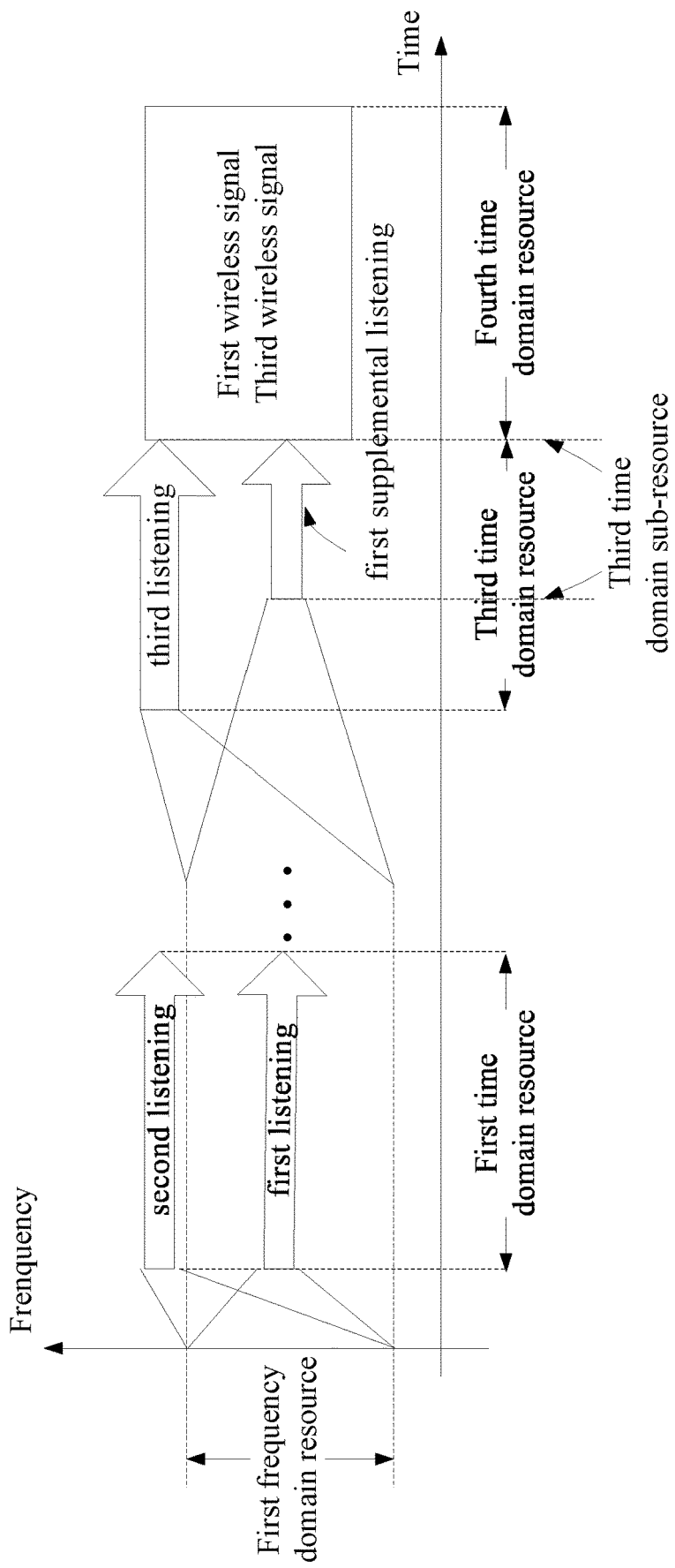
FIG. 7 illustrates a schematic diagram for the listening in the first time domain resource and the third resource according to one embodiment of the present disclosure.

Embodiment 7 illustrates a schematic diagram for the listening in the first time domain resource and the third resource, as shown in FIG. 7.

In Embodiment 7, the first node performs the first listening and the second listening in the first time domain resource of the first frequency domain resource; the first node performs a third listening and a first supplementary listening in the third time domain resource of the first frequency domain resource; the first node transmits a first wireless signal and a third wireless signal in a fourth time domain resource of the first frequency domain resource.

In Embodiment 7, the first receiving parameter group is used for the first listening and the first supplementary listening. The first wireless signal is transmitted by a first antenna port group; the first receiving parameter set is associated with the first antenna port group; the first supplementary listen comprises decrementing a first counter based on the first listening; the first receiving parameter group is used for the first listening and the first supplementary listening; the second receiving parameter group is used for the second listening; the second receiving parameter group is used for the third listening; the fourth time domain resource immediately follows the third time domain resource; the start time and the end time of the first supplementary listening are respectively the start time and the stop time of the third time domain resource; the third wireless signal is transmitted by the third antenna port group; the second receiving parameter group is associated to the third antenna port group; the start time and the end time of the third listening are the start time and the end time of the third time domain sub-resource immediately before the transmission time of the first wireless signal respectively; the end time of the third time domain sub-resource is the end time of the third time domain resource.

In one embodiment, the total length of the fourth time domain resource and the second time domain resource in the present disclosure does not exceed the longest time of the continuous transmission of the first node in the first frequency domain resource when the second antenna port group is adopted. That is, the signals are transmitted the first antenna port and the second antenna port simultaneously, thereby increasing the spatial multiplexing gain.

In one embodiment, the first node is capable of adjusting the start time of the third listening to ensure that the first wireless signal and the third wireless signal are simultaneously transmitted.

In one embodiment, the third time domain sub-resource is the second-type time slot in the present disclosure.

Embodiment 8

Figure 8:
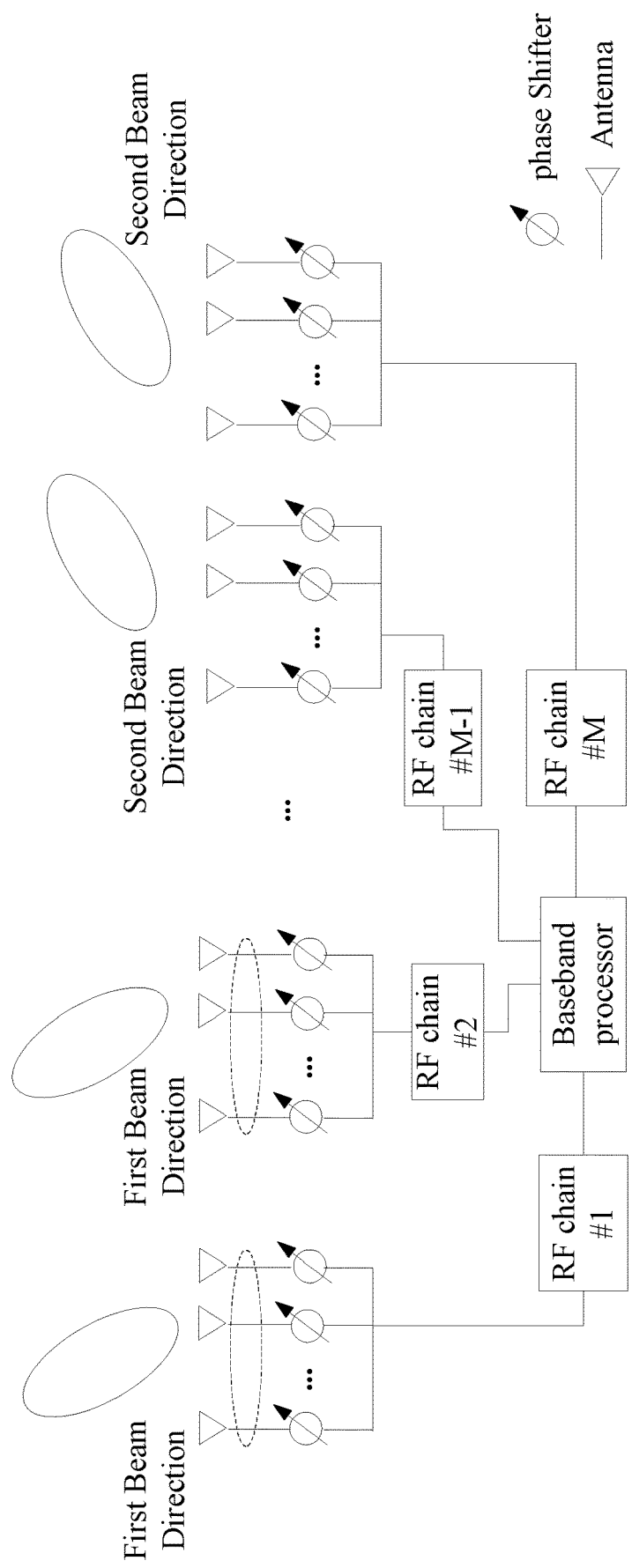
FIG. 8 illustrates a schematic diagram for generating beams in two directions in the first node according to one embodiment of the present disclosure.

Embodiment 8 illustrates a schematic diagram for generating beams in two directions in the first node, as shown in FIG. 8.

In Embodiment 8, the first node includes a baseband processor, and the baseband processor is connected to M radio frequency chains, which are the radio frequency chain #1, #2, . . . , #M−1, #M in FIG. 8. A part of the M RF chains forms a first beam direction, and another part of the RF chains form a second beam direction.

In one embodiment, an antenna port group includes a positive integer number of antenna ports. An antenna port is superimposed through antenna virtualization by an antenna of a positive integer number of antenna groups. An antenna group includes a positive integer of antennas. One antenna group is connected to the baseband processor through a RF chain. Different antenna groups correspond to different RF chains. A mapping coefficient of all antennas within a positive integer number of antenna groups included in a given antenna port to the given antenna port constitutes a beamforming vector corresponding to the given antenna port. The mapping coefficients of the plurality of antennas included in any given antenna group included in a given integer number of antenna groups included in the given antenna port to the given antenna port constitute an analog beamforming vector of the given antenna group. The diagonal arrangement of the analog beamforming vectors corresponding to the positive integer antenna groups constitutes an analog beam shaping matrix corresponding to the given antenna port. The mapping coefficients of the positive integer number of antenna groups to the given antenna port constitute a digital beamforming vector corresponding to the given antenna port. The beamforming vector corresponding to the given antenna port is obtained by the product of the analog beam shaping matrix and the digital beam shaping vector corresponding to the given antenna port. Different antenna ports in one antenna port group are composed of the same antenna group. Different antenna ports in the same antenna port group correspond to different beamforming vectors.

In one embodiment, the antenna port group is the first antenna port group in the present disclosure.

In one embodiment, the antenna port group is the second antenna port group in the present disclosure.

In one embodiment, the M radio frequency chains respectively correspond to M antenna ports; one antenna port is formed by superposing one or more antennas connected by corresponding RF chains through antenna virtualization. The antenna port of the first beam direction constitutes the first antenna port group in this disclosure. The antenna port of the second beam direction constitutes the second antenna port group in this disclosure.

In one embodiment, all the antennas of the first beam direction formed in the M RF chains adopts the first receiving parameter group of the present disclosure to perform the first listening and the first supplementary listening of the present disclosure.

In one embodiment, all the antennas of the second beam direction formed in the M RF chains adopts the second receiving parameter group of the present disclosure to perform the second listening of the present disclosure.

In one embodiment, all the antennas of the second beam direction formed in the M RF chains adopts the second receiving parameter group of the present disclosure to perform the third listening of the present disclosure.

In one embodiment, the first receiving parameter group in this disclosure includes the first beam direction, and the first beam direction is a receiving beam direction.

In a sub-embodiment of the foregoing embodiment, the energy detection in the first listening and the energy detection in the first supplementary listening in the present disclosure are respectively based on an EIRP, and include the beamforming gain corresponding to the first beam direction.

In one embodiment, the second receiving parameter group in this disclosure includes the second beam direction, and the second beam direction is a receiving beam direction.

In a sub-embodiment of the foregoing embodiment, the energy detection in the second listening and the energy detection in the third listening in the present disclosure are respectively based on an EIRP, and include the beamforming gain corresponding to the second beam direction.

In one embodiment, the analog beam direction corresponding to each antenna port in the first antenna port group in the present disclosure is the first beam direction; the analog beam direction corresponding to each antenna port in the second antenna port group in the present disclosure is the second beam direction.

In one embodiment, the first beam direction and the second beam direction correspond to analog beamforming. The beam formed by each of the RF chains in one part of the M RF chains is the first beam direction, and the formed by each of the RF chains in the other part of the M RF chains is the second beam direction.

In one embodiment, the first beam direction and the second beam direction both include analog beamforming and digital beamforming. The antennas in each of the RF chains in one part of the M RF chains are superposed by a first vector. Further, all the RF chains in the part of the RF chain are superposed by a second vector. That is Kronecker product of first vector and the second vector forms the first beam direction. The antennas in each of the RF chains in the other part of the M RF chains are superposed by a third vector. Further, all the RF chains in the other part of the RF chain are superposed by a fourth vector. That is Kronecker product of third vector and the fourth vector forms the second beam direction.

Embodiment 9

Figure 9:
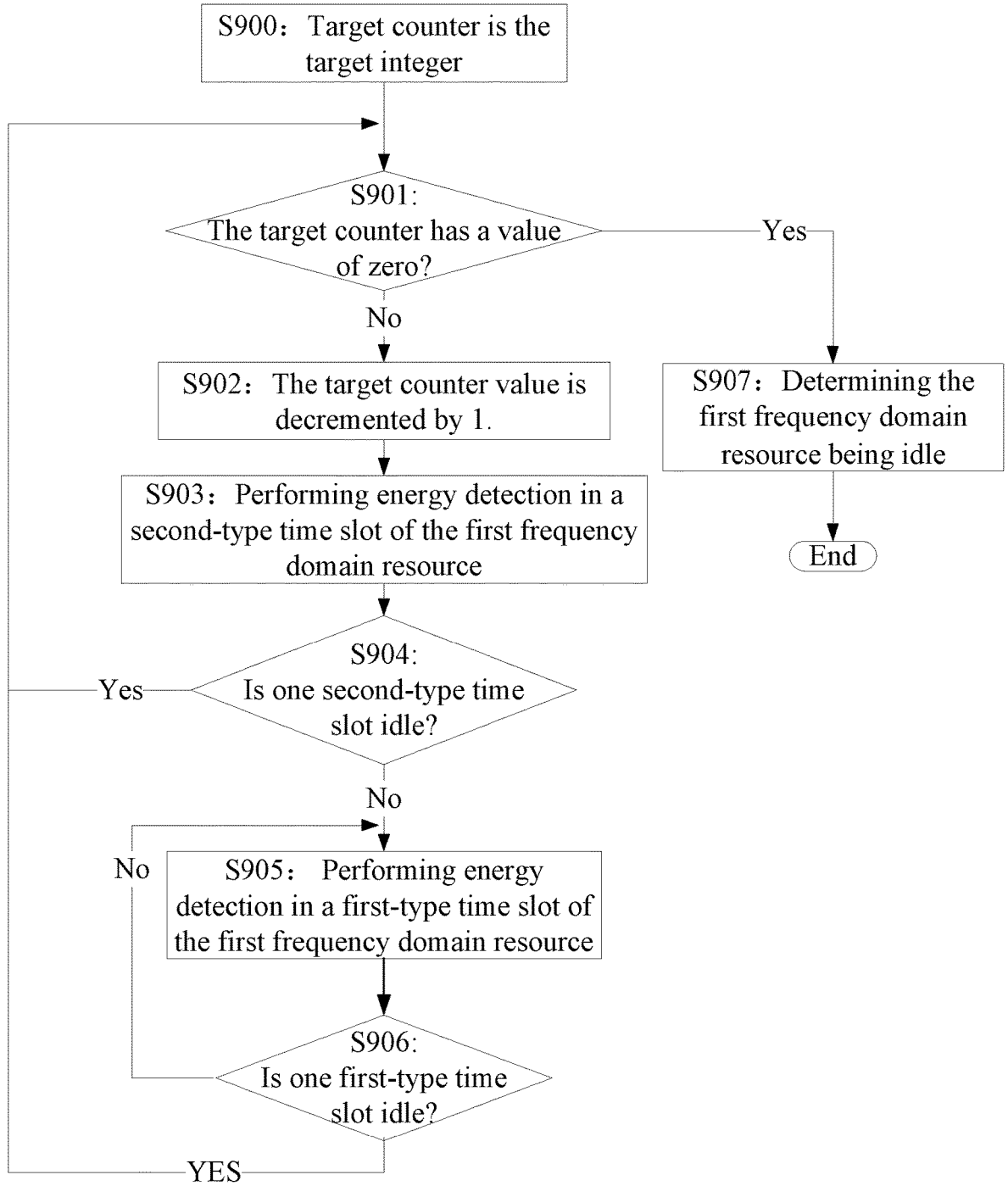
FIG. 9 illustrates a flowchart of a listening according to one embodiment of the present disclosure.

Embodiment 9 illustrates a flowchart of a listening, as shown in FIG. 9. The steps in FIG. 9 are executed by the first node.

In step S900, the target counter is the target integer. In step S901, the process involves determining whether the target counter has a value of zero. If the value is zero, the step S907 is performed to determining the first frequency domain resource being idle. If the value is not zero, the step S902 is performed to decrement the target counter by 1. That is, the value of the target counter at the end of the step S902=the value of the target counter at the beginning of step S902-1. In step S903, the energy detection is performed in a second-type time slot of the first frequency domain resource. In step S904, the process involves determining whether one second-type time slot is idle. If one second-type time slot is idle, the step S901 is performed. If not, the step S905 is performed. That is the energy detection is performed in a first-type time slot of the first frequency domain resource. In step S906, the process involves determining whether one first-type time slot is idle. If one first-type time slot is idle, the step S901 is performed. If not, the step S906 is performed.

In one embodiment, the counting of the first counter is greater than 1. If it is yes in the step S904, the essence of executing the step S901 and the step S902 is if the counting of the first counter is greater than 1, the counting of the first counter is deducted by 1 if an idle second-type time slot is obtained, otherwise the counting of the first counter is kept unchanged.

In one embodiment, if the determination result in the step S906 is not, the essence of continuously executing the step S901 is that the energy detection is performed on the first frequency domain resource until an idle first-type time slot is obtained.

In one embodiment, if the energy detected in the step S903 is less than the first pre-determined threshold for a given duration in the one second-type time slot, the one second-type time slot is determined as being idle (that is the determination result is yes) in the step S904; otherwise the one second-type time slot is determined as not being idle (that is the determination result is no) in the step S904.

In one embodiment, if the energy detected in the step S903 is less than the first pre-determined threshold in the one second-type time slot, the one second-type time slot is determined as being idle (that is the determination result is yes) in the step S904; otherwise the one second-type time slot is determined as not being idle (that is the determination result is no) in the step S904.

In one embodiment, if all of the second-type time slots included in the one of the first-type time slots are considered to be idle in the step S905, the one of the first-type time slots is considered idle in the step S906 (i.e., the determination result is yes); otherwise the one of the first-type time slots is considered not idle in the step S906 (i.e., the determination result is no).

In one embodiment, the unit of the first pre-determined threshold is dBm (millimeters).

In one embodiment, the unit of the first pre-determined threshold is mW (milliwatts).

In one embodiment, the first pre-determined threshold is configurable.

In one embodiment, the first pre-determined threshold is related to the maximum transmission power of the performer of the one listening.

In one embodiment, the performer of the one listening is the first node in the disclosure.

In one embodiment, the first-type time slot and the second-type time slot are respectively a defer duration and a slot duration.

In one embodiment, the duration of the second-type time slot is 9 us (microseconds) and the given duration is 4 us.

In one embodiment, the first listening in the present disclosure includes the one listening in Embodiment 9, and the target counter is the first counter in the present disclosure.

In one sub-embodiment of the above embodiment, the target integer is the first integer in the present disclosure, and in the step S900, the target counter is initialized to the first integer.

In one embodiment, the first supplementary listening in the present disclosure includes the one listening in Embodiment 9, and the target counter is the first counter in the present disclosure.

In one sub-embodiment of the above embodiment, the target integer is the value of the first counter at the end of the first listening in the disclosure. In the step S900, the first counter is set to a value of the first counter when the first listening ends, or the value the first counter is maintained when the first listening ends.

In one embodiment, the second listening in the present disclosure includes the one listening in Embodiment 9, and the target counter is the second counter in the present disclosure.

In one sub-embodiment of the above embodiment, the target integer is the second integer in the disclosure, and in the step S900, the target counter is initialized to the second integer.

In one embodiment, the first integer and the second integer are independently generated.

In one embodiment, the first integer and the second integer are respectively an element in a set consisting of a finite number of integers.

In one embodiment, the value range of the first integer is the same as the value range of the second integer.

In one embodiment, the second integer is always equal to the first integer, that is, the second listening includes initializing the second counter as the first integer.

In one embodiment, the first supplementary listening including decrementing the first counter based on the first listening refers to the first listening includes decrementing the first counter from the first integer to a first temporary integer, and the first supplementary listening includes decrementing the first counter from the first temporary integer to zero.

In one embodiment, the first supplementary listening including decrementing the first counter based on the first listening refers to the value of the first counter is unchanged in the first listening, that is the value of the first counter at the end of the first listening is the first integer; the first supplementary listening includes decrementing the first counter from the first integer to zero.

In one embodiment, the third listening in the present disclosure includes the one listening in Embodiment 9, and the target counter is the second counter in the present disclosure.

In one sub-embodiment of the above embodiment, in the step S900, the target counter is initialized to the target integer.

In one embodiment, the value of the target counter is a count of the target counter.

In one embodiment, the value of the target counter is a reading of the target counter.

In one embodiment, the value of the target counter is an integer corresponding to the state of the target counter.

In one embodiment, the value of the target counter is a calculation result of the target counter.

In one embodiment, determining that the first frequency domain resource is idle in the step S907 includes the first node is able to immediately transmit a wireless signal in the first frequency domain resource.

In one embodiment, determining that the first frequency domain resource is idle in the step S907 includes the first node does not immediately transmit a wireless signal in the first frequency domain resource. The first node is capable of performing wireless transmission in the case that the first frequency domain resource is determined to be idle in one second-type duration when the first node is ready to transmit in the first frequency domain resource, and the first frequency domain resource is determined to be idle when all of the second-type durations in one first-type duration prior to the wireless transmission.

In one embodiment, the first listening and the first supplemental listening together include all of the steps in FIG. 9.

In one sub-embodiment of the foregoing embodiment, the first listening includes the step S900, the step S901, the step S902, the step S903 and the step S904 in FIG. 9; the first supplementary listening includes the step S905, the step S906, the step S901, the step S902, the step S903, the step S904 and the step S907; the first node transmits a second wireless signal in the first frequency domain resource between the step S904 and the step S905.

In one sub-embodiment of the foregoing embodiment, the first listening includes the step S900, the step S901, the step S902, the step S903 and the step S904 in FIG. 9; the first supplementary listening includes the step S905, the step S906, the step S901 and the step S907; the first node transmits a second wireless signal in the first frequency domain resource between the step S904 and the step S905.

In one embodiment, the first-type duration is 25 us.

In one embodiment, the first-type duration is 43 us.

In one embodiment, the first-type duration is 79 us.

Embodiment 10

Figure 10:
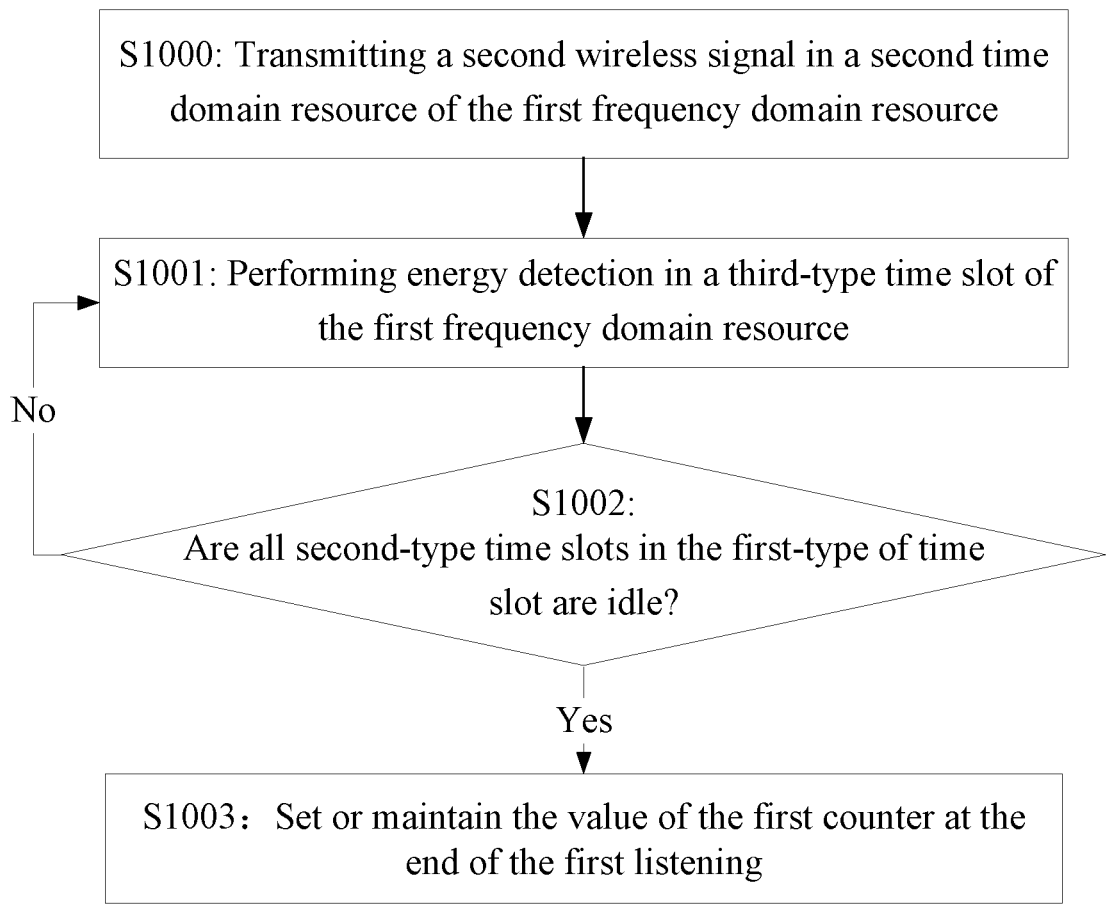
FIG. 10 illustrates a flowchart of a listening after transmitting a second wireless signal according to one embodiment of the present disclosure.

Embodiment 10 illustrates a flowchart of a listening after transmitting a second wireless signal, as shown in FIG. 10.

In the step S1000, the first node transmits a second wireless signal in a second time domain resource of the first frequency domain resource. In the step S1001, the energy detection is performed in a third-type time slot of the first frequency domain resource. In the step S1002, whether the one third-type time slot is idle is determined; if yes, the step S1003 is performed to set or maintain the value of the first counter at the end of the first listening; if not, the step S1001 is performed.

In one embodiment, the one third-type time slot is the one of the second-type time slots in the present application.

In one embodiment, the one third-type time slot is 36 us (microseconds).

In one embodiment, the one third-type time slot is composed of four consecutive second-type time slots.

In one embodiment, the first supplementary listening in the present application includes the step S1001, the step S1002, and the step S1003.

In one sub-embodiment of the above embodiment, the first supplementary listening includes all the steps in FIG. 9, wherein the step S1003 is the step S900, and the target counter in FIG. 9 is the first counter; the target integer in FIG. 9 is the value of the first counter at the end of the first listening.

In one embodiment, the first listening and the first supplemental listening together include all of the steps in FIG. 9.

In one sub-embodiment of the foregoing embodiment, in the step S907, determining whether the first frequency domain resource is idle includes the first node is able to immediately transmit a wireless signal in the first frequency domain resource through the first antenna port group.

In one embodiment, in the step S907, determining whether the first frequency domain resource is idle includes the first node does not immediately transmit a wireless signal in the first frequency domain resource. The first node is capable of performing wireless transmission through the first antenna port group in the case that the first frequency domain resource is determined to be idle in one second-type duration when the first node is ready to transmit in the first frequency domain resource, and the first frequency domain resource is determined to be idle when all of the second-type durations in one first-type duration prior to the wireless transmission.

In one embodiment, in the step S907, determining whether the first frequency domain resource is idle includes that the first node can immediately transmit a wireless signal in the first frequency domain resource through any antenna port group associated with the first receiving parameter group.

In one embodiment, in the step S907, determining whether the first frequency domain resource is idle includes that the first node does not immediately transmit a wireless signal in the first frequency domain resource. When the first node is ready to transmit in the first frequency domain resource, the first node is capable of performing wireless transmission through any antenna port group associated with the first receiving parameter group in the case that the first frequency domain resource is determined to be idle in one second-type duration, and the first frequency domain resource is determined to be idle when all of the second-type durations in one first-type duration prior to the wireless transmission.

Embodiment 11

Figure 11:
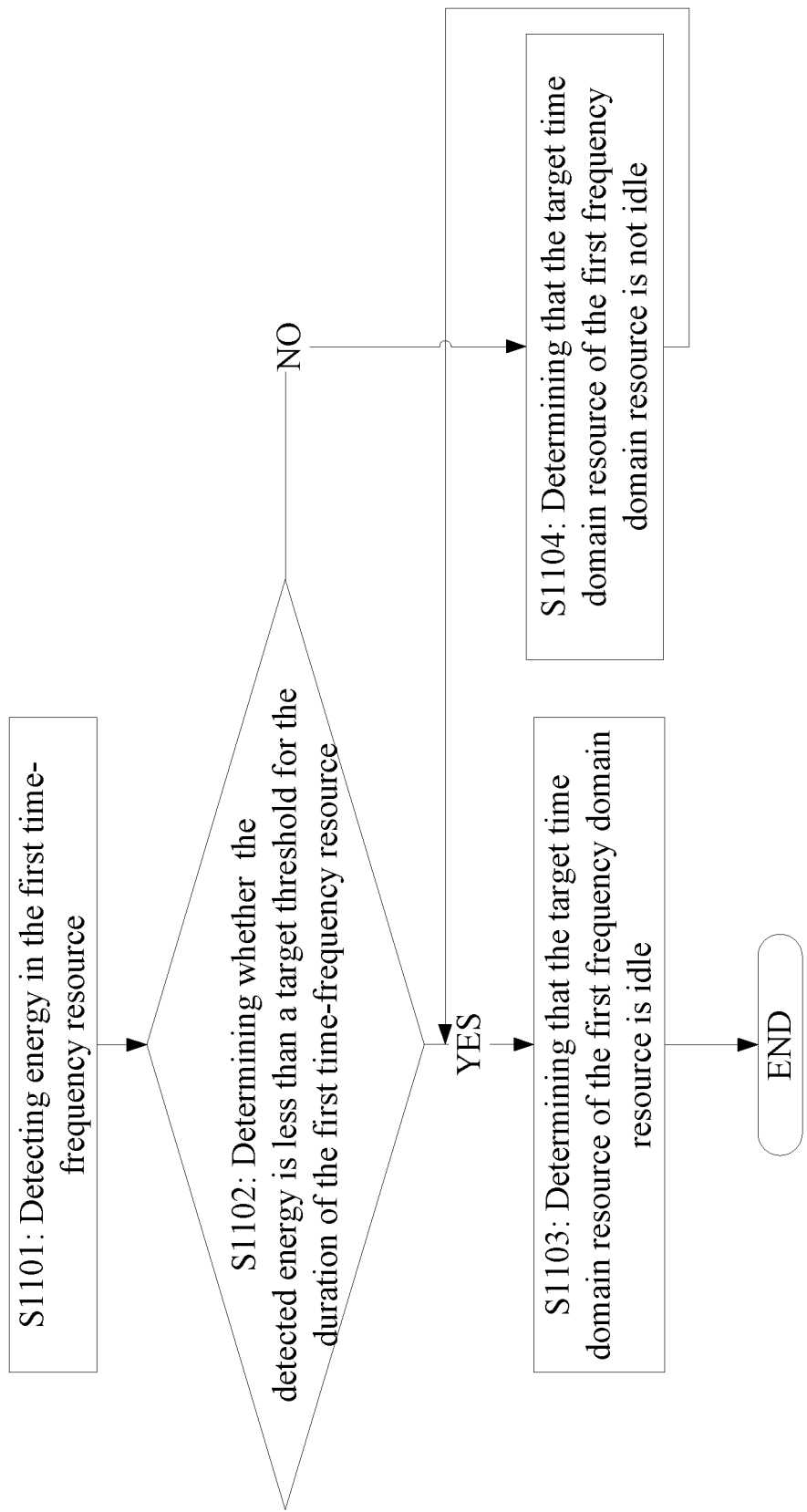
FIG. 11 illustrates a flowchart of performing energy detection in a first time-frequency resource according to one embodiment of the present disclosure.

Embodiment 11 illustrates a flowchart of performing energy detection in a first time-frequency resource, as shown in FIG. 11.

In the step S1101, the first node detects the energy in the first time-frequency resource. The first time-frequency resource belongs to the first frequency domain resource in the frequency domain, and belongs to the target time domain resource in the time domain. In the step S1102, whether the detected energy is less than a target threshold for the duration of the first time-frequency resource is determined. If yes, the step S1103 is performed, that is whether the target time domain resource of the first frequency domain resource is idle is determined. If not, the step S1104 is performed, that is the target time domain resource of the first frequency domain resource is determined as not being idle.

In one embodiment, the step S903 in Embodiment 9 includes the step S1101; the step S904 in Embodiment 9 includes the step S1102, the step S1103, and the step S1104.

In one embodiment, the duration of the first time-frequency resource is the given duration in Embodiment 9, and the target time domain resource is the one second-type time slot in Embodiment 9. The target threshold is the first pre-determined threshold in Embodiment 9.

Embodiment 12

Figure 12:
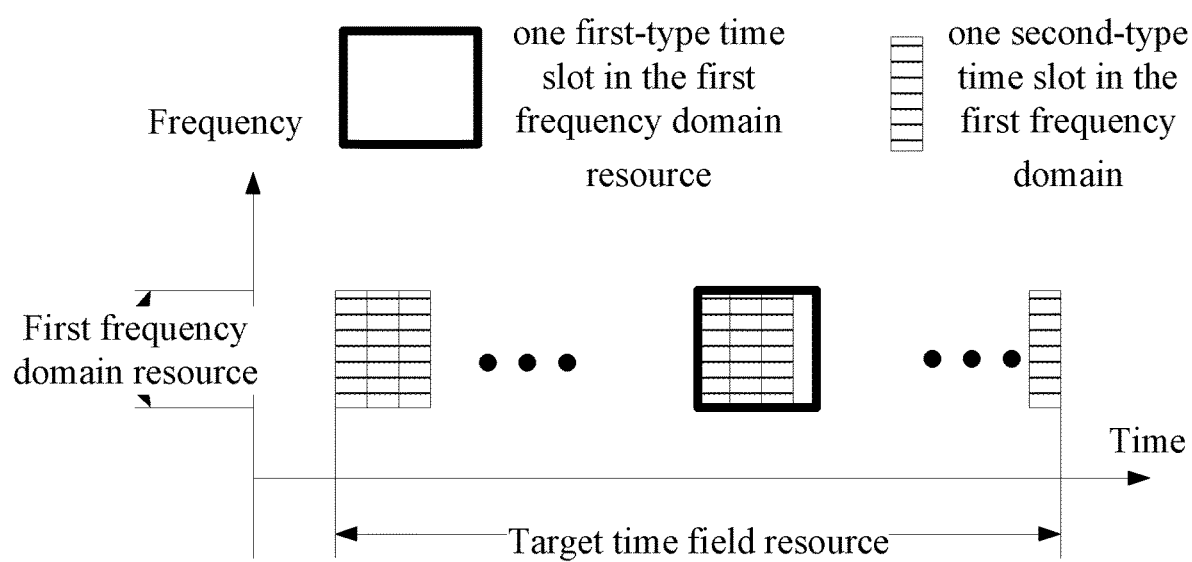
FIG. 12 illustrates a schematic diagram of a first-type time slot and a second-type time slot according to one embodiment of the present disclosure.

Embodiment 12 illustrates a schematic diagram of a first-type time slot and a second-type time slot, as shown in FIG. 12. In FIG. 12, the thick line grid indicates one first-type time slot in the first frequency domain resource, and the grid filled by horizontal lines indicates one second-type time slot in the first frequency domain resource.

In Embodiment 12, one first-type time slot includes three second-type time slots.

In one embodiment, the three second-type time slots are continuous in the one first-type time slot.

In one embodiment, the starting time of the earliest one of the three second-type time slots is the starting time of the one first-type time slot.

Embodiment 13

Figure 13:
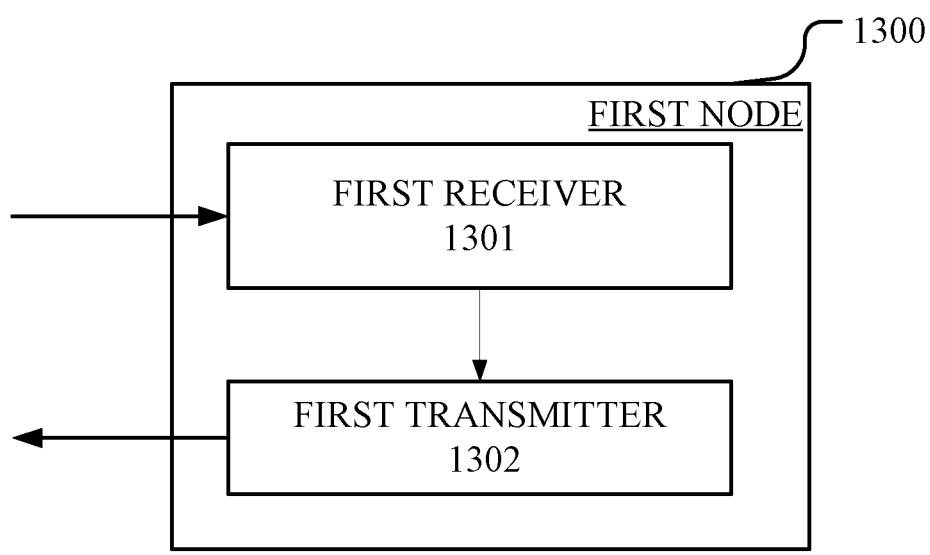
FIG. 13 illustrates a block diagram of the processing device in the first node according to one embodiment of the present disclosure.

Embodiment 13 illustrates a block diagram of the processing device in the first node, as shown in FIG. 13. In FIG. 13, the processing device 1300 of the first node includes a first receiver 1301 and a transmitter 1302.

In Embodiment 13, the first receiver 1301 performs a first listening in a first time domain resource of a first frequency domain resource, and performs a first supplementary listening in a third time domain resource of the first frequency domain resource. The first transmitter 1302 transmits a second wireless signal in a second time domain resource of the first frequency domain resource, and transmits a first wireless signal in a fourth time domain resource of the first frequency domain resource.

In Embodiment 13, a first receiving parameter set is used for the first listening and the first supplementary listening; the first wireless signal is transmitted by a first antenna port group; the first receiving parameter set is associated with the first antenna port group; the first supplementary listen comprises decrementing a first counter based on the first listening; the first time domain resource, the second time domain resource, the third time domain resource and the fourth time domain resource are in a time domain order.

In one embodiment, the first receiver 1301 performs a second listening in the first time domain resource of the first frequency domain resource; wherein the second receiving parameter set is used for the second listening; the second wireless signal is transmitted by a second antenna port group; the second receiving parameter set is associated with the second antenna port group; the second listening includes decrementing a second counter to zero.

In one embodiment, the first receiver 1301 performs a third listening in the third time domain resource of the first frequency domain resource; the first transmitter 1302 transmits a third wireless signal in the fourth time domain resource of the first frequency domain resource; wherein the second receiving parameter set is used for the third listening; the third wireless signal is transmitted by a third antenna port group; the second receiving parameter set is associated with the third antenna port group; the third listening is performed in a third time domain sub-resource right before the transmission time of the first wireless signal; the third time domain sub-resource belongs to the third time domain resource.

In one embodiment, the first node is a user equipment. The first receiver 1301 includes {the antenna 452, the receiver 454, and the receiving processor 456} in FIG. 4; the first transmitter 1302 includes {the antenna 452, the transmitter 454, and the transmitter processor 456} in FIG. 4.

In one embodiment, the first node is a user equipment. The receiver 1301 includes at least one of {the multi-antenna receiving processor 458, the controller/processor 459} in FIG. 4.

In one embodiment, the first node is a user equipment. The transmitter 1302 includes the multi-antenna transmitting processor 457 in FIG. 4.

In one embodiment, the first node is a base station. The first receiver module 1301 includes {the antenna 420, the receiver 418, the receiving processor 470} in FIG. 4; the first transmitter 1302 includes the antenna in FIG. 420. The transmitter 418, the transmitting processor 416}.

In one embodiment, the first node is a base station. The receiver 1301 includes at least one of {the multi-antenna receiving processor 472, the controller/processor 475} in FIG. 4.

In one embodiment, the first node is a base station. The transmitter 1302 includes the multi-antenna transmitting processor 471 in FIG. 4.

Embodiment 14

Figure 14:
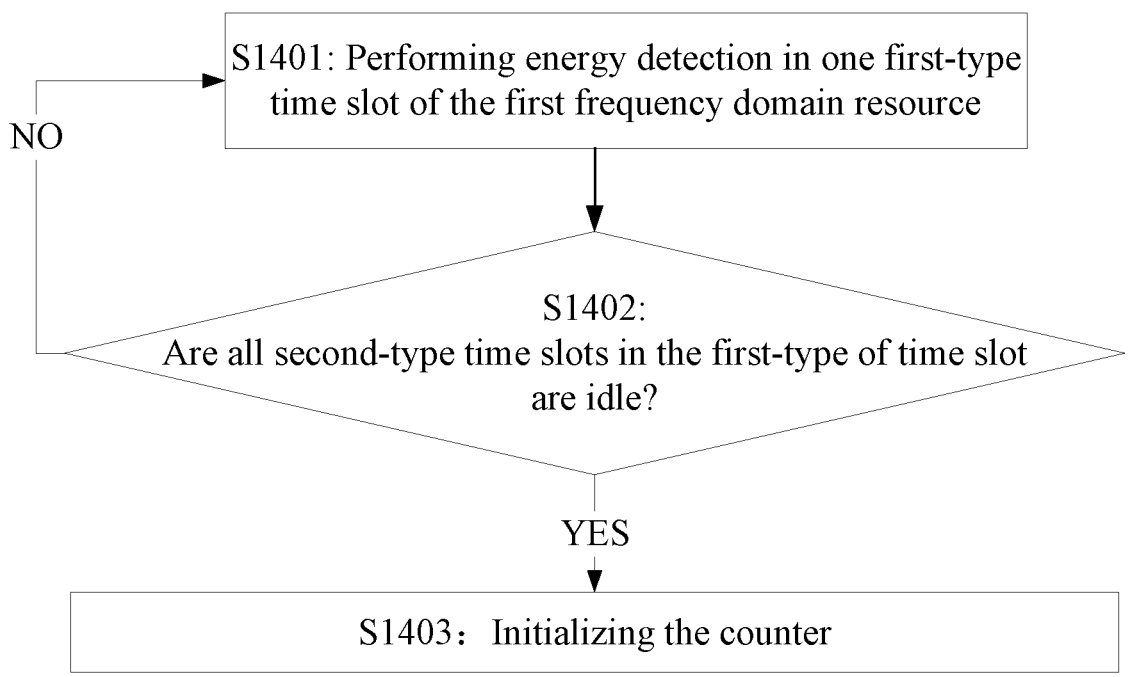
FIG. 14 illustrates a flow chart of counter initialization according to one embodiment of the present disclosure.

Embodiment 14 illustrates a flow chart of counter initialization, as shown in FIG. 14.

In step S1401, the first node performs energy detection in one first-type time slot of the first frequency domain resource. In step S1402, the process involves determining whether all second-type time slots in the first-type of time slot are idle. If not, the step S1401 is performed again. If yes, the step S1403 is performed, that is initializing the counter.

In one embodiment, the step S1403 in FIG. 14 is the step S900 in FIG. 9, that is, the target counter is initialized to the target integer, and the counter in Embodiment 14 is the target counter in Embodiment 9.

In one sub-embodiment of the above embodiment, the first listening in the present disclosure includes the steps in FIG. 14 and the step S901 in FIG. 9.

In one sub-embodiment of the above embodiment, the first listening in the present disclosure includes the steps in FIG. 14 and the step S901, S902, S903 and S904 in FIG. 9.

In one sub-embodiment of the above embodiment, the first listening in the present disclosure includes the steps in FIG. 14 and the steps in FIG. 9.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the disclosure includes but not limited to UAV, communication module on drone, remote control aircraft, aircraft, small aircraft, mobile phone, tablet, notebook, vehicle communication equipment, wireless sensor, network card, IoT terminal, RFID terminal, NB-IOT terminal, MTC (Machine Type Communication) terminal, eMTC (enhanced MTC) terminal, data card, network card, car communication equipment, low-cost mobile phone, low-cost tablet computer and other equipment, etc. The base station in the disclosure includes but not limited to macro-cellular base stations, micro-cellular base stations, home base stations, relay base stations, gNB (NR node B), TRP (Transmitter Receiver Point), and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a first node for wireless communication, comprising:
   performing a first listening in a first time domain resource of a first frequency domain resource;
   transmitting a second wireless signal in a second time domain resource of the first frequency domain resource;
   performing a first supplementary listening in a third time domain resource of the first frequency domain resource; and
   transmitting a first wireless signal in a fourth time domain resource of the first frequency domain resource;
   wherein a first receiving parameter group is used for the first listening and the first supplementary listening; the first wireless signal is transmitted by a first antenna port group; the first receiving parameter group is associated with the first antenna port group; the first supplementary listening comprises decrementing a first counter based on the first listening; the first time domain resource, the second time domain resource, the third time domain resource and the fourth time domain resource are in a time domain order; the first listening comprises decrementing the first counter, and the first supplemental listening comprises continuing to decrement the first counter from the counting at the end of the first listening.

2. The method according to claim 1, further comprising:
   performing a second listening in the first time domain resource of the first frequency domain resource;
   wherein a second receiving parameter group is used for the second listening; the second wireless signal is transmitted by a second antenna port group; the second receiving parameter group is associated with the second antenna port group; the second listening comprises decrementing a second counter to zero.

3. The method according to claim 2, wherein the first listening comprises initializing the value of the first counter as a first integer; the second listening comprises initializing the value of the second counter as a second integer.

4. The method according to claim 2, wherein the first receiving parameter group and the second receiving parameter group respectively comprises a first beamforming vector and second beamforming vector; the first beamforming vector is used for the energy detection of the first listening and the energy detection of the first supplementary; the second beamforming vector is used for the energy detection of the second listening.

5. The method according to claim 1, further comprising:
   performing a third listening in the third time domain resource of the first frequency domain resource; and
   transmitting a wireless signal in the fourth time domain resource of the first frequency domain resource;
   wherein the second receiving parameter group is used for the third listening; the third wireless signal is transmitted by a third antenna port group; the second receiving parameter group is associated with the third antenna port group; the third listening is performed in a third time domain sub-resource right before the transmission time of the first wireless signal; the third time domain sub-resource belongs to the third time domain resource.

6. The method according to claim 1, wherein at least one of the first listening and the first supplementary listening performs energy detection in the first frequency domain resource until obtaining an idle first-type time slot.

7. The method according to claim 1, wherein at least one of the first listening and the first supplementary listening performs energy detection in the first frequency domain resource; if the counting of the first counter is greater than zero; the first counter is decremented by one when obtaining an idle second-type time slot is obtained, otherwise the counting of the first counter is maintained.

8. The method according to claim 1, wherein the first node is a user equipment; or the first node is a base station.

9. The method according to claim 8, further comprising:
   receiving a first signaling;
   wherein the first node is a user equipment; the first signaling is used to indicate the first receiving parameter group, or the first signaling is used to indicate the first antenna port group.

10. The method according to claim 1, wherein the first frequency domain resource is deployed in an unlicensed spectrum.

11. A first node for wireless communication, comprising:
   a first receiver performing a first listening in a first time domain resource of a first frequency domain resource, and performing a first supplementary listening in a third time domain resource of the first frequency domain resource; and
   a first transmitter transmitting a second wireless signal in a second time domain resource of the first frequency domain resource, and transmitting a first wireless signal in a fourth time domain resource of the first frequency domain resource;
   wherein a first receiving parameter group is used for the first listening and the first supplementary listening; the first wireless signal is transmitted by a first antenna port group; the first receiving parameter group is associated with the first antenna port group; the first supplementary listening comprises decrementing a first counter based on the first listening; the first time domain resource, the second time domain resource, the third time domain resource and the fourth time domain resource are in a time domain order; the first listening comprises decrementing the first counter, and the first supplemental listening comprises continuing to decrement the first counter from the counting at the end of the first listening.

12. The first node according to claim 11, the first receiver further performs a second listening in the first time domain resource of the first frequency domain resource; wherein a second receiving parameter group is used for the second listening; the second wireless signal is transmitted by a second antenna port group; the second receiving parameter group is associated with the second antenna port group; the second listening comprises decrementing a second counter to zero.

13. The first node according to claim 12, wherein the first receiving parameter group and the second receiving parameter group respectively comprises a first beamforming vector and second beamforming vector; the first beamforming vector is used for the energy detection of the first listening and the energy detection of the first supplementary; the second beamforming vector is used for the energy detection of the second listening.

14. The first node according to claim 11, wherein the first listening comprises initializing the value of the first counter as a first integer; the second listening comprises initializing the value of the second counter as a second integer.

15. The first node according to claim 11, wherein:
the first receiver further performs a third listening in the third time domain resource of the first frequency domain resource;
the first transmitter further transmits a third wireless signal in the fourth time domain resource of the first frequency domain resource;
wherein the second receiving parameter group is used for the third listening; the third wireless signal is transmitted by a third antenna port group; the second receiving parameter group is associated with the third antenna port group; the third listening is performed in a third time domain sub-resource right before the transmission time of the first wireless signal; the third time domain sub-resource belongs to the third time domain resource.

16. The first node according to claim 11, wherein at least one of the first listening and the first supplementary listening performs energy detection in the first frequency domain resource until obtaining an idle first-type time slot.

17. The first node according to claim 11, wherein at least one of the first listening and the first supplementary listening performs energy detection in the first frequency domain resource; if the counting of the first counter is greater than zero; the first counter is decremented by one when obtaining an idle second-type time slot is obtained, otherwise the counting of the first counter is maintained.

18. The first node according to claim 11, wherein the first node is a user equipment; or the first node is a base station.

19. The first node according to claim 18, further comprising:
the first receiver receiving a first signaling;
wherein the first node is a user equipment; the first signaling is used to indicate the first receiving parameter group, or the first signaling is used to indicate the first antenna port group.

20. The first node according to claim 11, wherein the first frequency domain resource is deployed in an unlicensed spectrum.

* * * * *